US012705217B2

(12) United States Patent
Luby et al.

(10) Patent No.: US 12,705,217 B2
(45) Date of Patent: Aug. 11, 2026

(54) GENERATING DERIVED DIMENSIONS TO MODIFY DATA COLLECTION SCHEMAS WITHOUT ADDITIONAL DATA INGESTION

(71) Applicant: Adobe Inc., San Jose, CA (US)

(72) Inventors: Christopher Luby, Alpine, UT (US); David Wilcox, Lehi, UT (US); Eric Fox, Provo, UT (US); Jeffery Lawson, Lehi, UT (US); Kyle W. Smith, Draper, UT (US); Matthew Gould, Spanish Fork, UT (US); Michael Rimer, Saratoga Springs, UT (US); Nathan A. Purser, Highland, UT (US); Trevor Paulsen, Lehi, UT (US); William Brandon George, Pleasant Grove, UT (US)

(73) Assignee: Adobe Inc., San Jose, CA (US)

( * ) Notice: Subject to any disclaimer, the term of this patent is extended or adjusted under 35 U.S.C. 154(b) by 392 days.

(21) Appl. No.: 17/347,164

(22) Filed: Jun. 14, 2021

(65) Prior Publication Data

US 2022/0398231 A1 Dec. 15, 2022

(51) Int. Cl.
*G06F 16/215* (2019.01)
*G06F 16/22* (2019.01)
(Continued)

(52) U.S. Cl.
CPC ........ *G06F 16/215* (2019.01); *G06F 16/2291* (2019.01); *G06F 16/2423* (2019.01); *G06F 16/283* (2019.01); *G06F 16/285* (2019.01)

(58) Field of Classification Search
CPC .. G06F 16/215; G06F 16/285; G06F 16/2291; G06F 16/283; G06F 16/2423
See application file for complete search history.

(56) References Cited

U.S. PATENT DOCUMENTS 5,761,689 A 6/1998 Rayson et al.
5,950,190 A * 9/1999 Yeager .................. G06F 16/284
(Continued)

OTHER PUBLICATIONS

Educba, "Spell Check in Excel", https://web.archive.org/web/20210127112242/https://www.educba.com/excel-spell-check/ (Year: 2021).*
(Continued)

*Primary Examiner* — Khanh B Pham
*Assistant Examiner* — Brooks T Hale
(74) *Attorney, Agent, or Firm* — Keller Preece PLLC

(57) ABSTRACT

The present disclosure relates to systems, non-transitory computer-readable media, and methods for generating derived dimensions within ingested data collections. In particular, in one or more embodiments, the disclosed systems generate derived dimensions that modify or correct one or more organizational schemas of an ingested data collection when querying the ingested data collection. For example, the disclosed systems receive a user-defined definition, and generates a fallback expression based on the user-defined definition and aligned to the schema of a particular ingested data collection. In at least one embodiment, the disclosed systems generate the derived dimension by identifying and modifying one or more existing dimensions in the schema based on the fallback expression when reading data from the ingested data collection.

20 Claims, 14 Drawing Sheets

(51) Int. Cl.
*G06F 16/242* (2019.01)
*G06F 16/28* (2019.01)

(56) References Cited

U.S. PATENT DOCUMENTS

| | | | |
|---|---|---|---|
| 6,047,300 A | 4/2000 | Walfish et al. | |
| 6,993,473 B2 * | 1/2006 | Cartus | G06F 40/166 704/5 |
| 10,320,757 B1 | 6/2019 | Secker-Walker et al. | |
| 10,706,323 B1 | 7/2020 | Liebman | |
| 11,112,909 B1 | 9/2021 | Benkreira et al. | |
| 2001/0037228 A1 * | 11/2001 | Ito | G06Q 30/0201 705/7.29 |
| 2002/0116417 A1 * | 8/2002 | Weinberg | G06F 40/174 707/E17.058 |
| 2003/0183686 A1 | 10/2003 | Prendergast et al. | |
| 2011/0161311 A1 | 6/2011 | Mishne et al. | |
| 2012/0117102 A1 | 5/2012 | Meyerzon et al. | |
| 2012/0117500 A1 | 5/2012 | Maim | |
| 2013/0091138 A1 * | 4/2013 | Liensberger | G06F 40/169 707/E17.127 |
| 2015/0249742 A1 | 9/2015 | Li et al. | |
| 2017/0024186 A1 | 1/2017 | Fazl et al. | |
| 2020/0302506 A1 | 9/2020 | Parker et al. | |
| 2021/0049006 A1 | 2/2021 | Tommasi et al. | |
| 2021/0182935 A1 | 6/2021 | Malkiel et al. | |
| 2021/0224258 A1 | 7/2021 | Faruquie et al. | |
| 2022/0382824 A1 | 12/2022 | Kajinaga et al. | |
| 2023/0040678 A1 | 2/2023 | Karlin et al. | |

OTHER PUBLICATIONS

Chris Facer, "What is Data Filtering", Displayr, https://web.archive.org/web/20201127082609/https://www.displayr.com/what-is-data-filtering/ (Year: 2020).*

Diana, "AutoCorrect in Word", www.myrenocomputertutor.com, https://web.archive.org/web/20230924213945/http://www.myrenocomputertutor.com/autocorrect-in-word/ (Year: 2021).*

Gordeyuk, Victor; ScienceSoft; "See to Your Sales Data Hygiene with Salesforce Data Cleansing"; Published Sep. 8, 2019; https://www.scnsoft.com/blog/salesforce-data-cleansing.

Steinbach, Michael, George Karypis, and Vipin Kumar. "A comparison of document clustering techniques." (2000).

Deng, Jiabin, et al. "An improved fuzzy clustering method for text mining." 2010 Second International Conference on Networks Security, Wireless Communications and Trusted Computing. vol. 1. IEEE, 2010.

Jacob Devlin, Ming-Wei Chang, Kenton Lee, Kristina Toutanova: BERT: Pre-training of Deep Bidirectional Transformers for Language Understanding. NAACL-HLT (2019).

Mikolov, Tomas, et al. "Efficient estimation of word representations in vector space." arXiv preprint arXiv:1301.3781 (2013).

Stanovsky, Gabriel, and Mark Hopkins. "Spot the odd man out: Exploring the associative power of lexical resources." Proceedings of the 2018 Conference on Empirical Methods in Natural Language Processing. (2018).

George A. Miller. "Wordnet: A lexical database for English". Communication ACM, 38:39-41. (1992).

Christiane D. Fellbaum. "Book reviews: Wordnet: An electronic lexical database". (1998).

Jeffrey Pennington, Richard Socher, and Christopher D Manning. "Glove: Global vectors for word representation." In EMNLP, vol. 14, pp. 1532-1543. (2014).

Matthew E. Peters, Mark Neumann, Mohit Iyyer, Matt Gardner, Christopher Clark, Kenton Lee, and Luke Zettlemoyer. "Deep contextualized word representations". CoRR, abs/1802.05365. (2018).

Sai Muralidhar Jayanthi, et al. NeuSpell: A Neural Spelling Correction Toolkit. EMNLP (2020).

Microsoft, "Use AutoComplete when entering formulas", Microsoft.com, https://wellarchive.org/web/20201028123740/https:/support.microsoft.comien-us/office/use-autocomplete-when-entering-formulas-d51ef125-60ff-438f-ba26-d9bd6b363bbe# IDOEAACAAA=Newer_versions (Year: 2020).

Custom Guide, "How to Import Data into Excel", www.customguide.com, https://wellarchive.org/web/20201023020115/https:// www.customguide.com/excel/how-to-import-data-into-excel (Year: 2020).

U.S. Appl. No. 17/347,133, filed Mar. 6, 2023, Office Action.

U.S. Appl. No. 17/347,133, Aug. 4, 2023, Office Action.

Dickinson, "Microsoft Word2013: Auto Correct and Auto Format", https://web.archive.org/web/20170721160035/https:/www.dickinson.edu/download/downloads/id/2530/word_auto (Year: 2017).

U.S. Appl. No. 17/347,133, filed Nov. 24, 2023, Office Action.

U.S. Appl. No. 17/347,133, filed Mar. 20, 2024, Office Action.

U.S. Appl. No. 17/347,133, filed Jul. 5, 2024, Office Action.

U.S. Appl. No. 17/347,133 filed Oct. 28, 2024, Notice of Allowance.

* cited by examiner

Fig. 3

Fig. 4E
Trevor's Test Project
Fix the Implementation!
Ad Campaigns
Total Ad Views
387,550
Total Ad Views
Fixed Ad Name
URL
Color ID
Marketing Channel
Paint Store
Color Name
Month
Day
Store ID
Marketing Channel Type
Fixed Ad Name
1. Let's eat, kids!
2. Veggies are the best!
3. Clean your plate.
4. Dinner in bed? Why not?!
5. Vegetables are the best!
6. Ham is the best!
7. We're having cake for dinner!
8. Have another slice. now!
9. We're having pie for dinner!
85,066 21.9%
42,535 11.0%
42,522 11.0%
40,441 10.4%
37,429 9.7%
36,352 9.4%
35,364 9.1%
34,273 8.8%
33,569 8.7%
409
406
416
412
414a
410
402
116d

GENERATING DERIVED DIMENSIONS TO MODIFY DATA COLLECTION SCHEMAS WITHOUT ADDITIONAL DATA INGESTION

BACKGROUND

Recent years have seen significant improvements in data tracking and analysis. For example, conventional systems collect, ingest, and analyze large amounts of data in order to provide analytical insights. To illustrate, conventional systems often track user interactions with touchpoints, such as a website in order to gain insight about how users arrive at the website, website content that attracts users, how users interact with website elements, and conversions. During or after collection, the data is ingested to allow for analysis.

Although conventional systems track and analyze data, such systems have a number of problems in relation to flexibility, accuracy, efficiency of operation. For instance, conventional systems are generally constricted to a rigid schema of data organization at data ingestion time. Thus, if any underlying problems exist in the schema (e.g., data mis-labeling, incorrect data categorization), these problems inflexibly persist once the data is ingested into the pre-defined system of data organization. Even when conventional systems enable schema correction, conventional systems rigidly apply these corrections only to data ingested after the schema correction—leaving previously ingested data incorrectly configured and a split in the data.

The inflexibility of conventional systems further leads to additional problems with regard to accuracy and efficiency of operation. For example, conventional systems may inaccurately funnel data based on erroneous schema. To illustrate, conventional systems offer no method by which the data collection organization schema can be modified or corrected once raw data is ingested into the organization schema. Thus, when the organization schema of the data collection is flawed, conventional systems inaccurately ingest raw data into the error-laden organization schema. These schema-level inaccuracies ultimately result in flawed analytical insights.

Moreover, the inflexibilities and inaccuracies of conventional systems further results in various computational inefficiencies. For example, in order to overcome the shortcomings of conventional systems, users often employ difficult and costly post-ingestion patches that require large amounts of time and computing resources to implement. In implementing these additional post-ingestion patches, conventional systems require vast amounts of processing power and digital memory spent in running queries, generating displays, and storing mid-correction analysis results.

These along with additional problems and issues exist with regard to conventional analysis systems.

BRIEF SUMMARY

This disclosure describes one or more embodiments of systems, non-transitory computer-readable media, and methods that solve one or more of the foregoing or other problems in the art. In particular, the disclosed systems generate derived dimensions that effectively modify the schema organization of data collections after raw data ingestion and/or mid-campaign without requiring additional data ingestion. For example, the disclosed systems generate derived dimensions associated with a schema by generating, from a user-provided definition, a fallback expression that is aligned with a schema. The disclosed systems then, at query time, read from data from one or more existing dimensions of the schema based on the generated fallback expression. Utilizing derived dimensions, the disclosed systems are able to read data from an ingested data collection so as to merge existing dimensions of the schema, remove existing dimensions of the schema, add additional dimensions to the schema, and otherwise correct the schema—retroactively applied without requiring an additional ingestion of the underlying raw data.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 3 illustrates a detailed sequence diagram of the dimension derivation system generating one or more derived dimensions based on a user-defined definition in accordance with one or more embodiments.

DETAILED DESCRIPTION

Figure 1:
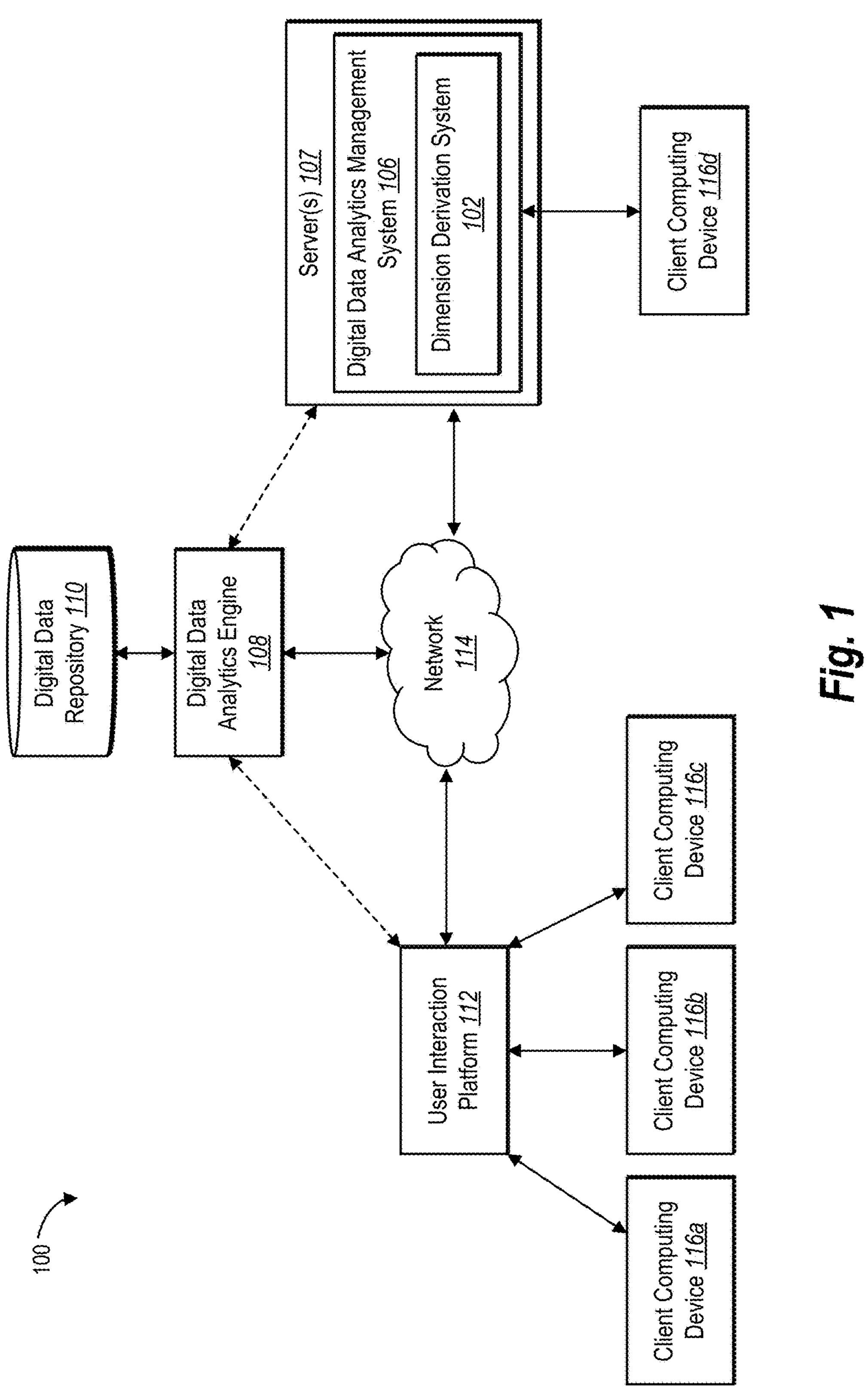
FIG. 1 illustrates a diagram of an environment in which a dimension derivation system can operate in accordance with one or more embodiments.

This disclosure describes one or more embodiments of a dimension derivation system that generates derived dimensions in connection with schema of data collections after raw data ingestion and without requiring additional data ingestion. To generate a derived dimension, the dimension derivation system receives a user-defined definition, then conditionally applies the user-defined definition to one or more dimensions of a schema of an ingested data collection in response to a query of the data within the ingested data collection. The dimension derivation system generates derived dimensions following raw data ingestion into a schema that is previously configured into existing dimensions. In one or more embodiments, the dimension derivation system generates the derived dimension to effectively modify one or more existing dimensions and/or dimension elements of the schema at query time as part of generating a report or other query response. For example, the dimension derivation system utilizes the derived dimension to query/read data from the ingested data collection in a manner that merges existing dimensions and/or dimension elements of the schema, removes an existing dimension and/or dimension element of the schema, or otherwise modifies or corrects an existing dimension and/or dimension element of the schema. Furthermore, as the dimension derivation system makes the corrections as part of responding to a query, the dimension derivation system does so without altering or otherwise modifying the raw data organized within the schema or the schema itself.

In more detail, the dimension derivation system receives an ingested data collection of raw data ingested into a schema from a digital data analytics engine. For instance, the digital data analytics engine receives and/or otherwise amasses raw analytics data from one or more user interaction platforms. For example, the raw data includes analytics data associated with touchpoints associated with a third-party or remote computing system. If the third-party is associated with both an e-commerce website and a brick-and-mortar retail location, the digital data analytics engine receives raw data associated with one or more of in-person purchases (e.g., retail location identifiers, time and date of purchases, types of purchases), interactions with a website (e.g., page lands, link clicks, page scrolls, cart additions), interactions with mobile computing applications, interactions with set-top boxes, interactions with call centers, and/or online purchases (e.g., time and date of online purchases, types of online purchases, time products are left in carts prior to purchase). The digital data analytics engine receives and ingests the raw data in a schema that organizes the raw data into an ingested data collection. For example, the schema organizes the raw data into a plurality of dimensions and associated dimension elements, where each dimension is associated with a particular type of data.

More specifically, in order to generate comprehensive and intuitive analysis of raw data, a digital data analytics engine generates and maintains pre-configured schema for organizing data. In one or more embodiments, a schema includes a plurality of dimensions (e.g., data buckets or storage compartments) and associated dimension elements, where the digital data analytics engine generates each dimension to receive a pre-defined type or association of raw data. For instance, the digital data analytics engine generates a dimension for raw data associated with URLs, such that the dimension includes dimension elements associated with URLs of referring websites and URLs of pages accessed within a website. In another example, the digital data analytics engine generates a dimension within a schema for raw data associated with a particular marketing campaign. Thus, for the dimension associated with the particular marketing campaign, dimension elements may include specific ad titles associated with that campaign. Accordingly, the digital data analytics engine ingests raw data into a schema of dimensions based on the specification and/or configuration of each dimension in the schema to generate an ingested data collection.

If one or more dimensions of the schema is incorrectly specified or configured, the digital data analytics engine may incorrectly ingest the raw data. These incorrect dimensions are often not readily apparent until after ingestion of raw data occurs and is analyzed. For example, a report of data extracted from an incorrectly configured dimension (e.g., the dimension includes a mis-named dimension element) will show errors and/or inaccuracies. Accordingly, the dimension derivation system generates derived dimension to modify or otherwise correct existing dimensions, at query time as part of querying the data—without necessitating an additional ingestion of the raw data or destroying any underlying raw data.

For example, in at least one embodiment, the dimension derivation system receives a user-defined definition for a derived dimension. In one or more embodiments, the dimension derivation system receives a user-defined definition via one or more digital data analytics user interfaces in connection with a particular schema. For example, the user-defined definition adheres to an end-user friendly syntax, such that a user may easily configure the user-defined definition.

In at least one embodiment, the dimension derivation system utilizes the user-defined definition to generate a fallback expression that is aligned with a particular schema. For example, the dimension derivation system determines a schema associated with a particular ingested data collection. The dimension derivation system then transforms or translates the user-defined definition into a fallback expression that adheres to a syntax of the determined schema.

To further generate a derived dimension, the dimension derivation system determines one or more existing dimensions and/or dimension elements of the schema that correspond with the fallback expression. For example, based on the fallback expression, the dimension derivation system determines or identifies one or more particular dimensions, and then reads data out of the one or more particular dimensions based on instructions in the fallback expression.

To illustrate, in some embodiments, in response to a query for data from a particular dimension within an ingested data collection, the dimension derivation system generates a derived dimension that effectively merges two or more existing dimension elements by reading data out of the particular dimension element and another dimension element within the particular dimension of the ingested data collection. In additional or alternative embodiments, in response to the query for data from the particular dimension within the ingested data collection, the dimension derivation system generates a derived dimension that effectively removes an existing dimension element by reading data out of every other dimension element within the particular dimension. In additional or alternative embodiments, in response to the query for data from the particular dimension within the ingested data collection, the dimension derivation system generates a derived dimension that effectively creates a new dimension element within an existing dimension by reading raw data from an existing dimension element into a newly generated dimension element. In one or more embodiments, the dimension derivation system generates the derived dimension without altering or otherwise modifying the raw data already ingested into the data collection. Instead, the dimension derivation system generates the derived dimension to effectively modify the organization of the data returned from a query of the ingested data collection.

In other words, a derived dimension acts as an instruction layer that controls how data is read from an ingested data collection in response to a query. In particular, a derived dimension causes the dimension derivation system to return data in response to a query in a manner that corrects or accounts for errors in the schema used to ingest the data or for desired user changes to the schema that may not be the result of an error. Because the derived dimension operates at query time, the dimension derivation system need not change or fix the schema or change the data organization of the data in the ingested data collection. As such, the dimension derivation system is able to correct errors or make desired changes almost instantaneously (e.g., in a matter of seconds) rather than days or weeks as required to curate an ingested data collection.

As mentioned above, the dimension derivation system provides various benefits over conventional analytics systems. For example, as discussed above, conventional systems rely on rigid schemas for organizing data into predefined systems of organization to allow for analysis. Indeed, due to different data sources, some with little control, it can take 6 months to years to set up an analytics systems in a desired configuration. When data is ingested according to such rigid schemas with an error, conventional systems generally provide inaccurate results. To overcome this, conventional systems require analysists to run computationally expensive database queries or data pipelines to extract the incorrectly organized data. These additional steps are costly and slow, and require large amount of computing resources. Furthermore, such data manipulation can have destructive effects on the underlying data. If the analyst prefers instead to correct the schema associated with the ingested data collection, conventional systems require that the data be re-ingested into the ingested data collection to reflect the corrected schema—which wastes further computing resources and only applies moving forward (i.e., does not retroactively correct errors).

Contrary to this, the dimension derivation system provides flexibility by generating derived dimensions that allow for quick and easily modification of an ingested data collection in a non-destructive manner at query-time. For example, rather than requiring (and expending computing resources in) correcting the organization of an ingested data collection that has been organized according to a flawed schema, the dimension derivation system generates derived dimensions according to user-defined definitions to effectively modify existing dimensions organizing data within an ingested data collection by altering how data is read out of the ingested data collection. In generating derived dimensions, the dimension derivation system increases the flexibility of computing systems by effectively correcting the data organization schema associated with the ingested data collection without requiring an additional ingestion of the data—thereby ensuring that dimension derivation system applies the corrections to all data in the ingested data collection (i.e., retroactively in connection with previously ingested data).

Additionally, the dimension derivation system increases the accuracy of a computing system. For example, by generating derived dimensions that quickly and easily modify and correct how raw data is read from an ingested data collection, the dimension derivation system greatly increases the accuracy of reports, displays, and other insights. The dimension derivation system further increases the accuracy of the ingestion of additional data when a derived dimension is generated mid-campaign. For instance, the dimension derivation system generates derived dimensions that retroactively apply to previously ingested data collections, but then continue to correctly read additionally ingested data from updated ingested data collections—such as when the dimension derivation system generates a derived dimension mid-campaign.

Moreover, the dimension derivation system increases the efficiency of a computing system. For example, as discussed above, conventional systems expend large amounts of computing resources (e.g., processing power, computer memory, etc.) in enabling an analyst to modify an ingested data collection that is incorrectly organized based on a flawed schema. Conversely, the dimension derivation system increases computational efficiency by quickly and easily correcting how raw data is read from an ingested data collection in response to a few user interactions with a single user interface.

Furthermore, the dimension derivation system further increases the speed of a computing system. For example, conventional systems generally require that organizational errors within an ingested data collection be addressed by re-ingesting the entire data collection—a process that can take hours, days, or even weeks. The dimension derivation system drastically speeds this process by generating derived dimensions that modify how data is read from an ingested data collection. Thus, the dimension derivation system generates a derived dimension that correctly reads data from an incorrectly configured dimension or dimension element in seconds or less.

As illustrated by the foregoing discussion, the present disclosure utilizes a variety of terms to describe features and advantages of the dimension derivation system. Additional detail is now provided regarding the meaning of such terms. For example, as used herein, the term "data organization schema" or "schema" refers to instructions for feeding or tagging data into, or in association with, one or more data structures. To illustrate, in one embodiment, a schema includes instructions, definitions, structures for ingesting (e.g., tagging) raw data into one or more dimensions and associated dimension elements. For instance, a schema defines a dimension to accept specific types and/or segments of raw data. In one embodiment, a schema specifies a dimension that ingests or tags raw data associated with a particular tag, name, or metadata. In one or more embodiments, a schema defines a dimension that includes dimension elements.

As used herein, the term "dimension" refers to set, category, or classification of values for organizing or attributing underlying data (e.g., a set of values for analyzing, grouping, organizing, or comparing data). For example, dimensions comprise broad categories of data or narrow and specific categories. Example dimensions include geographic location (e.g., country, state, or city), browser, referrer, search engine, device type, product, webpage, gender, purchase, downloads, age, digital content campaign, etc.

As used herein, a "dimension element" refers to a sub-category or member of a dimension. For example, a schema defines a dimension for "Cities" and includes dimension elements specific to particular city names (e.g., "London," "Paris," "New York"). Dimensions and dimension elements are associated with various components. For example, a dimension and/or dimension element is associated with components such as, but not limited to: a title or name, an input data type, an input data size, input formatting rules, exception rules, and so forth.

As used herein, the term "ingestion" refers to a process of aggregating, consolidating, and organizing raw data according to a schema. For example, the dimension derivation system ingests raw data from one or more sources into one or more dimensions based on a particular schema. As used herein, an "ingested data collection" refers to an amount of raw data that has been ingested into one or more dimensions based on a particular schema. In other words, an ingested data collection includes data organized into dimensions and dimension elements.

As used herein, "query time" refers to a point at which a system can query an ingested data collection. Specifically, data collection can take weeks, months, or years. Similarly, data ingestion can take place simultaneously with data collection, intermittently with data collection, or after data collection. In any event, the dimension derivation system ingests collected data to allow for further analysis. For example, once the dimension derivation system receives an ingested data collection from the digital data analytics engine, the dimension derivation system is able to run queries against ingested data collection because the data is organized based on a specific schema. Unlike conventional systems, at this point (i.e., at "query time"), the dimension derivation system is able to generate one or more derived dimensions that correct or otherwise modify how data is read from the ingested data collection. Specifically, as described in more detail below, the dimension derivation system corrects or otherwise modifies how data is read from an ingested data collection, on the fly at query time without having to re-ingest the data.

As used herein, a "derived dimension" refers to a dimension that is generated on-the-fly relative to an ingested data collection. For example, the dimension derivation system generates a derived dimension relative to an ingested data collection that effectively modifies the organization of the ingested data collection by changing how specific data is read from the ingested data collection. To illustrate, the dimension derivation system generates a derived dimension that based on what data is returned from the data collection in response to a query effectively merges existing dimensions of the schema, removes one or more dimensions from the schema, adds one or more dimensions to the schema, or otherwise modifies one or more dimensions of the schema. Similarly, the dimension derivation system generates a derived dimension that effectively merges existing dimension elements of the schema, removes one or more dimension elements from the schema, adds one or more dimension elements to the schema, or otherwise modifies one or more dimension elements of the schema.

As used herein, "raw data" refers to digital information associated with user touchpoints. For example, raw data includes URL data associated with user interactions with one or more web sites and/or web pages, sales data from one or more web sites and/or brick-and-mortar retail locations, user profile information, other user account information, or other analytics information. In one or more embodiments, a digital data analytics engine receives raw data as part of a batch process, from a tracking pixel, from an API, or from a direct data stream. In one or more implementations raw data comes from a third-party source where the data is built/maintained/governed by another party and cannot, or cannot easily, be adjusted at ingest time. Additionally, raw data can comprise data that has valuable pieces but in their raw form are not consumable (e.g., a fully-qualified URL with query string and hash parameters).

As used herein, a "user-defined definition" refers to user-input instructions for generating a derived dimension. In one or more embodiments, a user-defined definition adheres to an easily understood, front-end syntax; such as any of a variety of scripting languages. Additionally, as used herein, a "fallback expression" refers to a regular expression generated based on a user-defined definition and aligned to a particular schema.

Additional detail regarding the dimension derivation system will now be provided with reference to the figures. For example, FIG. 1 illustrates a schematic diagram of an example system environment 100 (e.g., the "environment" 100) for implementing a dimension derivation system 102 in accordance with one or more embodiments. Thereafter, a more detailed description of the components and processes of the dimension derivation system 102 is provided in relation to the subsequent figures.

As shown in FIG. 1, the environment 100 includes server(s) 107, a digital data analytics engine 108, a user interaction platform 112, client computing devices 116*a*-116*d*, and a network 114. Each of the components of the environment 100 communicate via the network 116, and the network 116 may be any suitable network over which computing devices communicate. Example networks are discussed in more detail below in relation to FIG. 7.

As mentioned, the environment 100 includes the client computing devices 116*a*, 116*b*, 116*c*, and 116*d*. The client computing devices 116*a*-116*d* include one of a variety of computing devices, including a smartphone, tablet, smart television, desktop computer, laptop computer, virtual reality device, augmented reality device, or other computing device as described in relation to FIG. 7. Although FIG. 1 illustrates a number of client computing devices 116*a*-116*d*, in some embodiments, the environment 100 includes multiple different client computing devices, each associated with the same or other components of the environment 100.

As illustrated in FIG. 1, the environment 100 includes a user interaction platform 112. In one or more embodiments, the user interaction platform 112 is any platform that receives and/or collects raw data from client computing device 116*a*-116*c*. For example, the user interaction platform 112 is a third-party server that tracks user interaction data associated with one or more specific websites, retail locations, and other user touchpoints. Additionally or alternatively, the user interaction platform 112 is a tracking pixel embedded in a web page that detects and/or collects data associated with the web page. Additionally or alternatively, the user interaction platform 112 is a software development kit (SDK) that enables one or more third-party servers to communicate raw data to other components of the environment 100. In at least one embodiment, the user interaction platform 112 communicates raw data to the digital data analytics engine 108 via the network 114, or directly (e.g., indicated by the dashed line).

As illustrated in FIG. 1, the environment 100 includes the digital data analytics engine 108. In one or more embodiments, the digital data analytics engine 108 receives and ingests raw data based on one or more schema. For example, based on the instructions of a schema, the digital data analytics engine 108 receives and ingests raw data into one or more preconfigured dimensions and associated dimension elements—thereby creating an ingested data collection. The digital data analytics engine 108 stores ingested data collections, schema, received raw data, and other metadata associated with ingested data collections in a digital data repository 110.

As illustrated in FIG. 1, the environment 100 includes the server(s) 107. The server(s) 107 may include one or more individual servers that may generate, store, receive, analyze, and transmit electronic data. For example, the server(s) 107 may include a digital data analytics management system 106, which in turn implements the dimension derivation system 102. In one or more embodiments, the digital data analytics management system 106 receives and analyzes data in various ways. To illustrate, the digital data analytics management system 106 receives ingested data collections and associated schema from the digital data analytics engine 108. The digital data analytics management system 106 then analyzes the ingested data collection based on the dimensions and other organizational structures therein. The digital data analytics management system 106 also generates reports based on the analyses, and generates user interfaces including the reports for the client computing device 116*d* (e.g., an analyst client computing device). Additionally or alternatively, the digital data analytics management system 106 receives and ingests raw data from the user interaction platform 112. The digital data analytics management system 106 receives ingested data collections and schema from the digital data analytics engine 108 via the network 114 or directly (e.g., indicated by the dashed line).

As further illustrated in FIG. 1, the digital data analytics management system 106 implements the dimension derivation system 102. In one or more embodiments, the dimension derivation system 102 generates derived dimensions that effectively modify the organization of ingested data collections by changing how specific data is read out of the ingested data collection in order to avoid schema-based errors and mistakes. As will be discussed in greater detail below, the dimension derivation system 102 generates derived dimensions that retroactively (e.g., post-ingestion) modify how data is read from existing dimensions and/or dimension elements within ingested data collections without destroying the data within the ingested data collections.

Although FIG. 1 illustrates the components of the environment 100 connected in a specific way, other embodiments are possible. For example, the digital data analytics management system 106 receives raw data directly from the user interaction platform 112. Additionally or alternatively, the digital data analytics engine 108 is implemented on the server(s) 107 along with the digital data analytics management system 106. Similarly, while FIG. 1 illustrates a given number of servers, platforms, and client computing devices, in additional or alternative embodiments the functionality of the components of the environment 100 is implemented by any number of servers, platform, and client computing devices.

Figure 2:
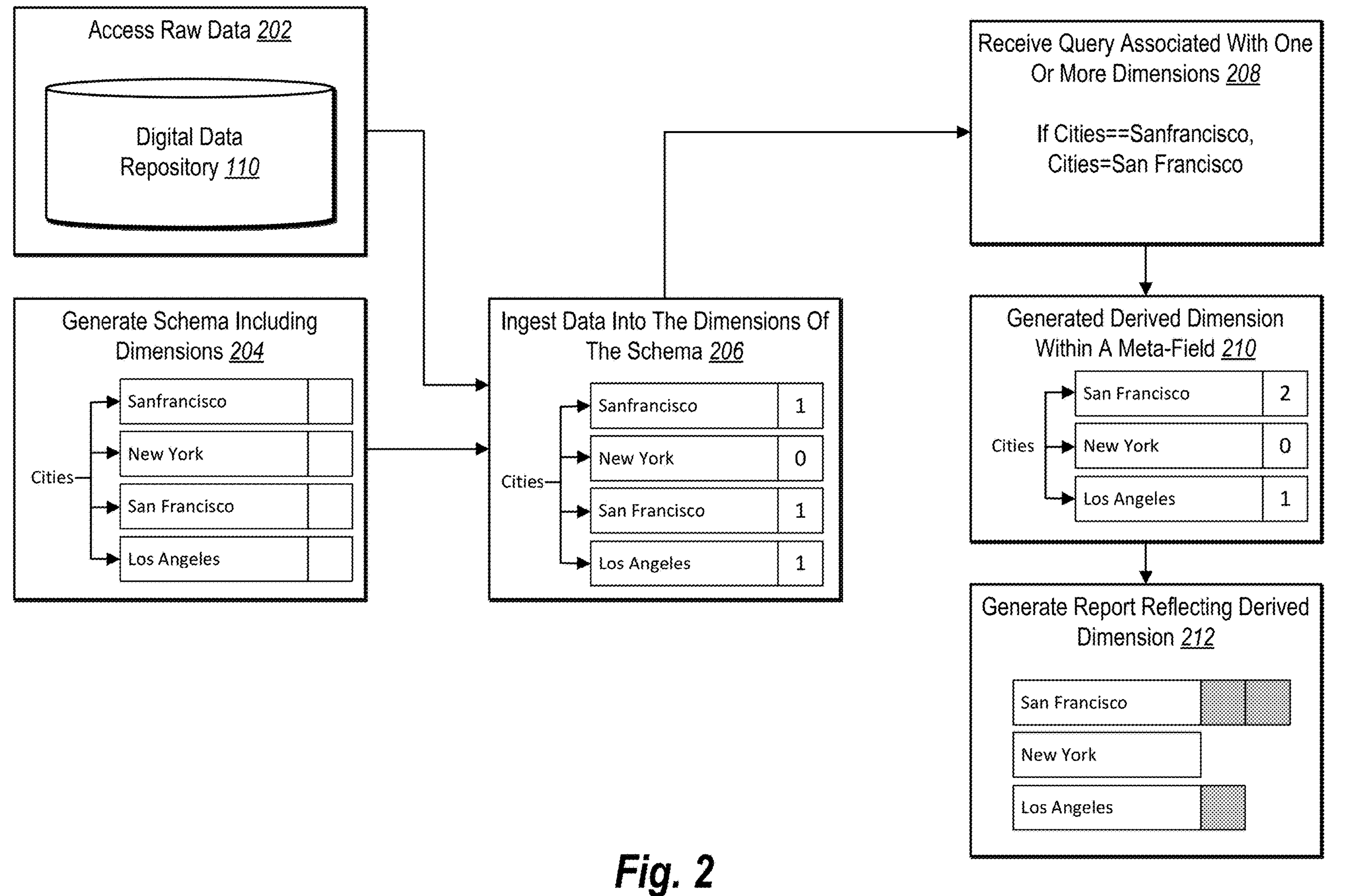
FIG. 2 illustrates a diagram of the dimension derivation system generating a derived dimension in connection with an ingested data collection in accordance with one or more embodiments.

As mentioned above, the dimension derivation system 102 generates derived dimensions that effectively modify the organization of ingested data collection by reading data from the ingested data collections at query time in a manner that corrects or otherwise accounts for a desired change in the organization of ingested data collection. FIG. 2 illustrates an overview of the digital data analytics engine 108 ingesting raw data based on a schema, and the dimension derivation system 102 generating a derived dimension. For example, the digital data analytics engine 108 performs an act 202 of accessing raw data. To illustrate, as mentioned above, the digital data analytics engine 108 accesses raw data from the digital data repository 110, or directly from the user interaction platform 112.

Additionally, the digital data analytics engine 108 performs an act 204 of generating schema including dimensions or otherwise obtains a schema. For example, the digital data analytics engine 108 generates a schema based on user-input configurations that specify rules and/or instructions for ingesting raw data into one or more dimensions to create an ingested data collection. The digital data analytics engine 108 further generates the schema such that raw data ingested according to the schema is converted or otherwise transformed to a standardized or canonical format and/or syntax. As shown by FIG. 2, the schema has an error (i.e., a city called Sanfrancisco that is mis-spelled and a duplicate of San Francisco).

As further shown in FIG. 2, the digital data analytics engine 108 performs an act 206 of ingesting data into the dimensions and dimension elements defined by the schema. For example, the digital data analytics engine 108 ingests raw data into an ingested data collection utilizing the dimensions defined or configured by the associated schema. In one or more embodiments, the schema defines the dimensions to accept or tag raw data (e.g., page lands, link clicks, etc.) associated with a specific type or association of data. As a result of ingesting the raw data based on the schema, the digital data analytics engine 108 generates an ingested data collection. Additionally or alternatively, the digital data analytics management system 106 performs any or all of the acts 202, 204, and 206.

Once the data is ingested into the schema, a user can then run queries against the ingested data set to make analytic insights. At this point, the user may discover the error in the schema (the duplicate mis-spelled city). The data that forms the ingested data set can comprise weeks, months, or even years of data. As mentioned above, conventional systems do not allow for query time modification of the ingested data.

Additionally, as shown in FIG. 2, the dimension derivation system 102 performs an act 208 of receiving a query associated with one or more dimensions of the ingested data collection generated as a result of the act 206. For example, the dimension derivation system 102 receives a query that includes a user-defined definition associated with generating a derived dimension. In one or more embodiments, the dimension derivation system 102 saves the received query and/or generates a user interface element associated with the received query for display on the client computing device 116*d*. In particular, the user can generate a user-defined definition indicating a desired correction or modification to the ingested data collection (e.g., the user-defined definition requests a merging of data for a dimension element associated with the duplicate misspelled city with data for a dimension element associated with the correct city).

As further shown in FIG. 2, the dimension derivation system 102 performs the act 210 of generating a derived dimension. For example, in response to a query associated with the ingested data collection (e.g., a selection of the user interface element associated with a particular user-defined definition), the dimension derivation system 102 transforms or translates the user-defined definition into a fallback expression aligned to the schema of the ingested data collection. The dimension derivation system 102 then executes the fallback expression against the ingested data collection to generate the derived dimension. In particular, the dimension derivation system 102 utilizes the dimension derivation to query the ingested data collection in a manner that the desired correction or modification is reflected in the data returned in response to the query.

More specifically, the derivation system 102 generates a derived dimension (a combination or merging of the dimension elements of Sanfranciso and San Francisco) and stores the derived dimension within a meta-field. As used herein, a meta-field is a data location to which the derivation system 102 can load and store (in some embodiments temporarily) corrected data collected/filtered/merged etc. in accordance with a fallback expression. The meta-field is storage location separate from the ingested data collection. Thus, in one or more embodiments, the derivation system 102 creates the derived dimension without modifying the data in the ingested data collection.

Finally, as shown in FIG. 2, the dimension derivation system 102 and/or the digital data analytics management system 106 performs the act 212 of generating a report reflecting the derived dimension. The dimension derivation system 102 generates the report within a user interface that illustrates how the derived dimension modifies one or more dimensions and/or dimension elements of the ingested data collection. The dimension derivation system 102 further provides the generated report to the client computing device 116*d* and/or stores the generated report for later use. As shown the report reflections the correction specified by the fallback expression despite the ingested data collection still containing the error of the miss-spelled name.

Figure 3:
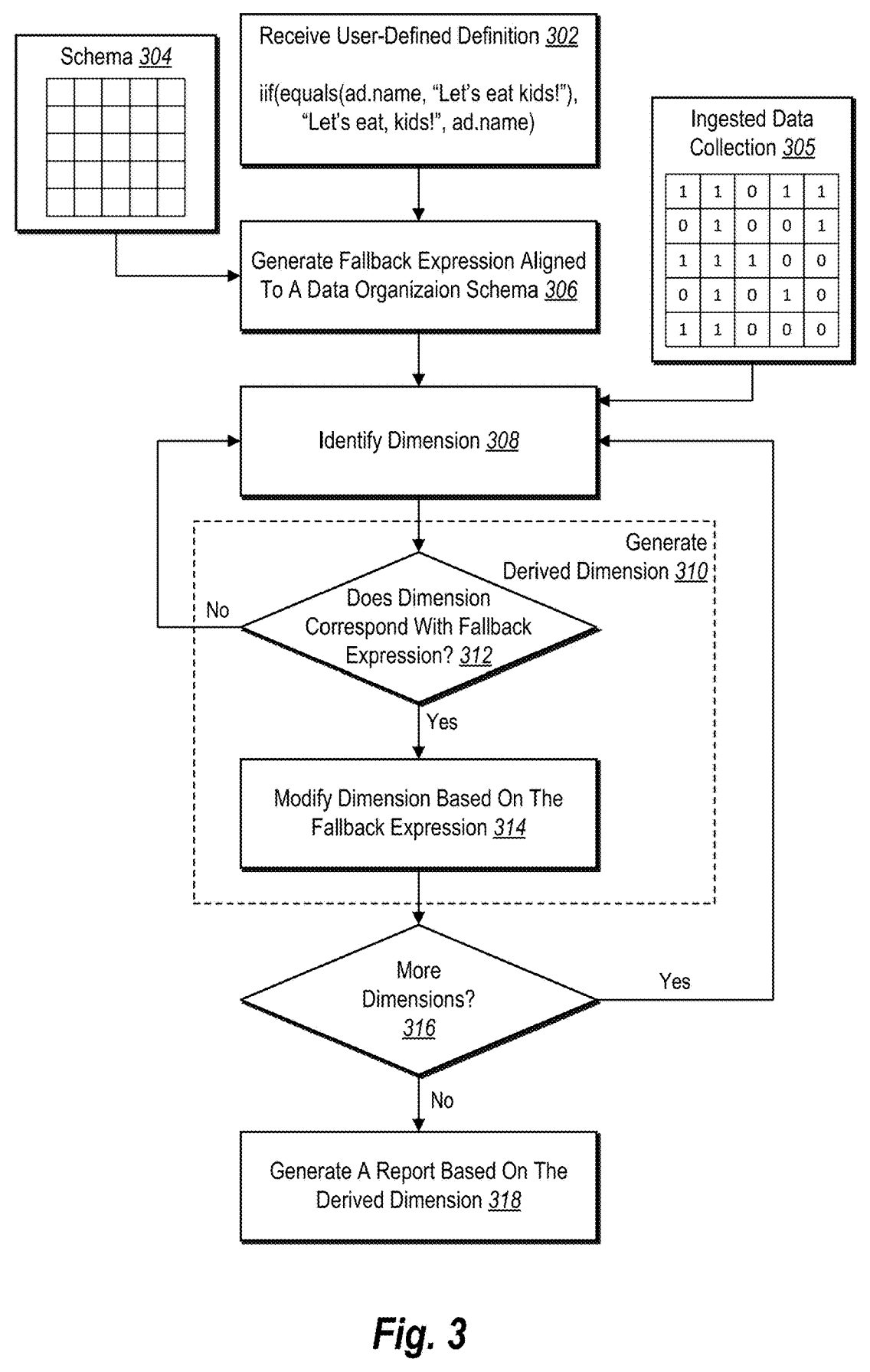

As mentioned above, the dimension derivation system 102 generates a derived dimension from an ingested data collection to generate a report or query response that reflects a modification or correction to the organization of the data within the ingested data collection. FIG. 3 illustrates a sequence diagram of the dimension derivation system 102 generating a derived dimension and generating a report based on the derived dimension. Broadly, the dimension derivation system 102 generates a fallback expression based on a user-defined definition, identifies one or more dimensions in the ingested data collection, queries the one or more dimensions based on instructions in the fallback expression to return modified dimension(s) or dimension element(s).

In more detail, and as shown in FIG. 3, the dimension derivation system 102 performs an act 302 of receiving a user-defined definition. In one or more embodiments, the dimension derivation system 102 receives the user-defined definition in response to one or more user interactions configuring or otherwise inputting the user-defined definition via one or more user interfaces. For instance, the dimension derivation system 102 receives the user-defined definition as manually inputted code or as a series of user selections via a definition builder user interface. In at least one embodiment, the dimension derivation system 102 receives the user-defined definition in a high-level scripting languages such as, but not limited to, JavaServer pages standard tag library expression language (JEXL). In other embodiments, the dimension derivation system 102 receives the user-defined definition in another type of notation.

The dimension derivation system 102 further performs the act 306 of generating a fallback expression aligned to a data organization schema. For example, the dimension derivation system 102 generates the fallback expression based on the received user-defined definition. To illustrate, the dimension derivation system 102 translates the user-defined definition into the fallback expression aligned to a schema 304. For instance, the schema 304 includes accepted syntax, configurations, and formatting associated with the dimensions and dimension elements for tagging raw data into a complex data structure. Thus, in at least one embodiment, the dimension derivation system 102 generates the fallback expression by converting the user-defined definition into a regular expression with syntax and formatting aligned to the schema 304.

To generate a derived dimension, the dimension derivation system 102 iteratively performs acts 308, 312, 314, and 316 in connection with an ingested data collection 305 (e.g., structured and organized in accordance with the schema 304). For example, the dimension derivation system 102 performs the act 308 of identifying a dimension in the ingested data collection 305. To illustrate, in at least one embodiment, the ingested data collection 305 is columnar in structure and organization. Accordingly, the dimension derivation system 102 identifies a dimension in the ingested data collection 305 by identifying a column or columnar data structure in the ingested data collection 305. In alternative embodiments, the ingested data collection 305 is non-column such as a non-sequential database.

The dimension derivation system 102 then performs the act 312 by determining whether the dimension corresponds with the fallback expression. For example, the dimension derivation system 102 determines whether the dimension corresponds with the fallback expression by determining whether a dimension element or other component of the dimension corresponds with an element or component specified by the fallback expression. To illustrate, if the fallback expression includes instructions for modifying a dimension with a column name "cities," the dimension derivation system 102 determines that the dimension corresponds with the fallback expression if the dimension has the column name "cities."

In response to determining that the dimension does not correspond with the fallback expression (e.g., "No" in the act 312), the dimension derivation system 102 again performs the act 308 and identifies another dimension in the ingested data collection 305. For example, the dimension derivation system 102 identifies another dimension in the ingested data collection 305 by identifying a consecutive dimension in the ingested data collection. Additionally or alternatively, the dimension derivation system 102 identifies another dimension randomly in the ingested data collection 305. The dimension derivation system 102 again performs the act 312 of determining whether the newly identified dimension corresponds with the fallback expression.

In response to determining that the dimension corresponds with the fallback expression (e.g., "Yes" in the act 312), the dimension derivation system 102 performs an act 314 of modifying the dimension based on the fallback expression. In one or more embodiments, the dimension derivation system 102 modifies the dimension (or one or more dimension elements associated with the dimension) based on the fallback expression by modifying how data is read out of the dimension and/or dimension elements. For instance, the dimension derivation system 102 determines a component of the dimension or dimension element (e.g., a dimension name, a dimension element data type, etc.) that corresponds with one or more instructions specified by the fallback expression, and then reads data out of the component of the dimension or dimension element according to the instructions specified by the fallback expression. For example, the fallback expression may include instructions for modifying a name of a dimension. Accordingly, the dimension derivation system 102 modifies the dimension by reading data out of the originally named column or data structure into a column or data structure named accordance with the fallback expression. In one or more embodiments, the dimension derivation system 102 effectively modifies a dimension by generating a derived dimension in a meta-field as part of responding to a query. For example, the dimension derivation system 102 can generate derived dimension by renaming the dimension, by copying the dimension data, by removing the dimension, and/or by adding a new dimension that includes previously mis-tagged raw data as data is read/retrieved from the ingested data collection in response to a query that invokes the fallback expression. Similarly, the dimension derivation system 102 effectively modifies a dimension element by renaming the dimension element, by copying the dimension element, by removing the dimension element, and/or by adding a new dimension element to other dimension elements associated with a particular dimension as data is read/retrieved from the ingested data collection in response to a query that invokes the fallback expression.

In one or more embodiments, the acts 312 and 314 together comprise the sub-acts in an act 310 of generating a derived dimension. For example, in at least one embodiment, by modifying the dimension of the ingested data collection 305, the dimension derivation system 102 effectively creates a new, post-ingestion dimension (e.g., a derived dimension) within a meta-field. To illustrate, the newly generated derived dimension has the practical effect of merging two existing dimensions within the ingested data collection 305. For instance, by effectively changing a name of an existing dimension to the name of another existing dimension based on the fallback expression, the dimension derivation system 102 generates the derived dimension that causes the data of both existing dimensions to be read out of the ingested data collection in response to a query associated with a single existing dimension name (e.g., the name of the second dimension). Similarly, by changing a name of a dimension element of an existing dimension to the same name as another dimension of the existing dimension, the dimension derivation system 102 generates the derived dimension that causes data of both existing dimensions elements to be read out of the dimension in response to a query associated with single dimension element name.

Additionally or alternatively, the newly generated derived dimension has the practical effect of removing an existing dimension or dimension element from data of the ingested data collection 305 to be used in response to a query that invokes the fallback expression. For instance, by causing one or more components of the dimension or dimension element (e.g., a dimension or dimension element name) to be read out of the ingested data collection to reflect a predetermined negative value (e.g., "null," "0"), the dimension derivation system 102 generates the derived dimension such that it is earmarked to be disregarded in connection with any further analysis or reporting invoking the fallback expression. For example, during analysis and report generation the dimension derivation system 102 disregards dimensions or dimension elements that are named or otherwise denoted with the predetermined negative value based on a fallback expression. Accordingly those "removed" dimensions or dimension elements are still present in the ingested data collection 305, but have no impact on any further analysis.

Additionally or alternatively, the newly generated derived dimension has the practical effect of adding an all-new dimension to the ingested data collection 305. For instance, by effectively modifying or otherwise re-tagging one or more components of an existing dimension or dimension element, the dimension derivation system 102 generates the derived dimension by causing components of the existing dimension or dimension element to be read out of the ingested data collection under a different dimension name, tag, or column. Thus, the derived dimension reads the data from the existing dimensions or dimension elements into a new data structure (e.g., a new column or columnar data structure) in a meta-field. In yet further embodiments, the dimension derivation system 102 effectively modifies existing dimensions in any number of other ways to generate the derived dimension.

In one or more embodiments, a fallback expression may apply to more than one dimension in the ingested data collection 305. Accordingly, after modifying the dimension based on the fallback expression as part of retrieving data in response to a query, the dimension derivation system 102 performs an act 314 of determining whether there are more unanalyzed dimensions in the ingested data collection 305. If there are additional dimensions (e.g., "Yes" in the act 316) the dimension derivation system 102 performs the act 308 of identifying an additional dimension in the ingested data collection 305 for further analysis (e.g., in the act 310 of generating an additional dimension).

In response to determining that there are no additional unanalyzed dimensions in the ingested data collection 305 (e.g., "No" in the act 316—indicating all dimensions have been analyzed), the dimension derivation system 102 performs an act 318 of generating a report based on the derived dimension and any other data returned as part of the query. In one or more embodiments, the dimension derivation system 102 generates a report by selectively accessing one or more dimensions and utilizing one or more components of the accessed one or more dimensions to generate one or more compilations and/or displays. For instance, the dimension derivation system 102 generates reports including lists, tables, diagrams, charts, or other displays to illustrate one or more dimensions and/or dimension elements in connection with one or more metrics (e.g., as further shown below with regard to FIGS. 4A-4H). In particular, the dimension derivation system 102 generates reports utilizing data read from the ingested data collection 305, including but not limited to a derived dimension stored in a meta-field.

As just discussed, the dimension derivation system 102 generates derived dimensions and reports reflecting derived dimensions. In one or more embodiments, the dimension derivation system 102 generates the derived dimensions and reports in response to detected user interactions and input via one or more user interfaces. For example, FIGS. 4A-4H illustrate the dimension derivation system 102 generating derived dimensions and reports in response to detected user interactions and input received via one or more user interfaces.

Figure 4A:
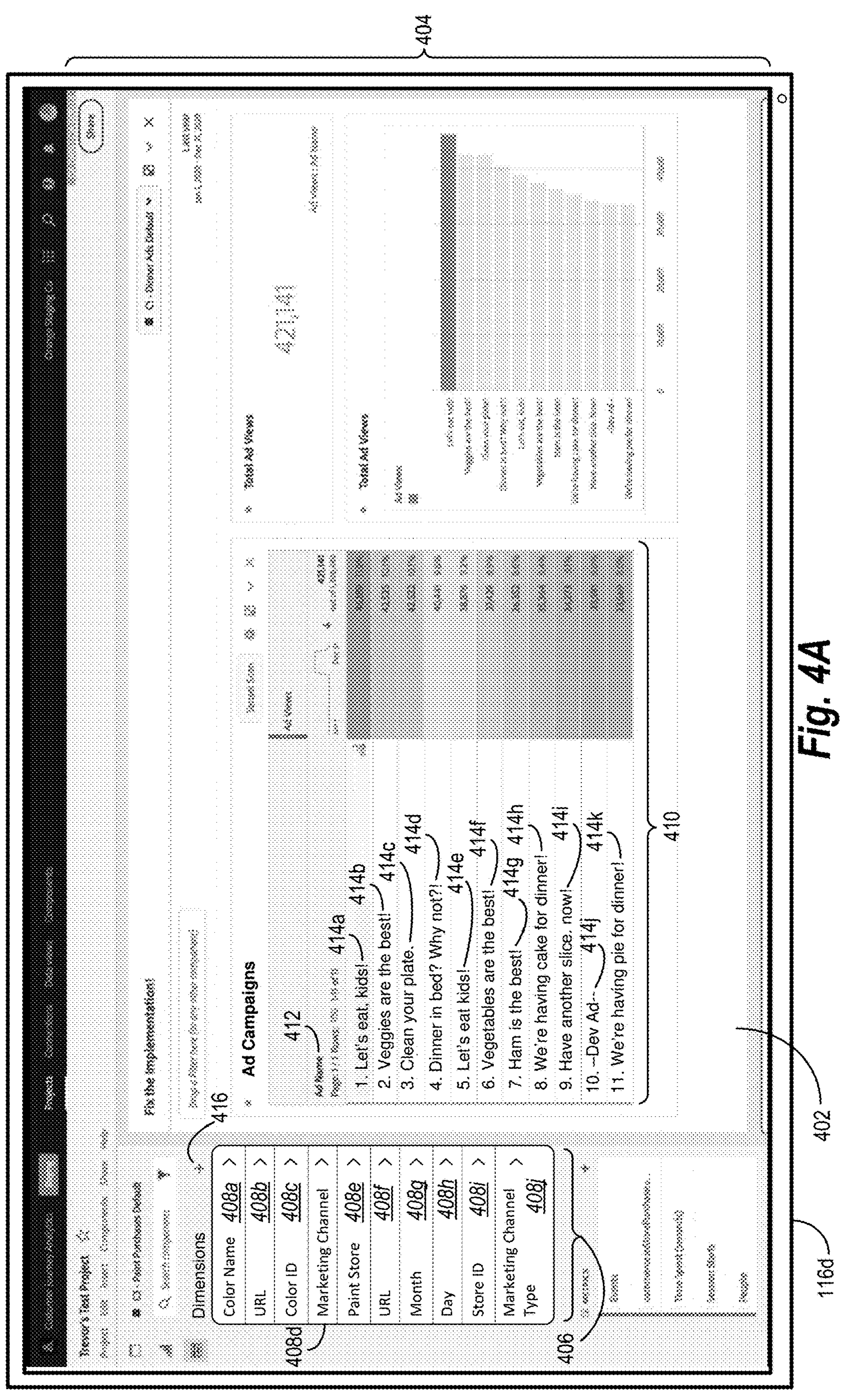
FIGS. 4A-4H illustrate one or more user interfaces generated by the dimension derivation system as part of generating derived dimensions and reports utilizing the derived dimensions in accordance with one or more embodiments.

For example, as shown in FIG. 4A, the digital data analytics management system 106 generates an analytics management user interface 402 for display on a client computing device (e.g., the client computing device 116*d*, as shown in FIG. 1). In one or more embodiments, the digital data analytics management system 106 generates the analytics management user interface 402 including a report canvas 404, and a sidebar with a listing of dimensions 406. In at least one embodiment, the report canvas 404 provides a space within the analytics management user interface 402 where the digital data analytics managements system 106 displays various reports in response to detected user configurations.

Similarly, the listing of dimensions 406 includes one or more dimension indicators 408*a*-408*j* that correspond with dimensions within a current or active ingested data collection. For example, in at least one embodiment, an active ingested data collection includes dimensions with dimension names including "Color Name," "URL," "Color ID," and so forth. In one or more embodiments, the dimension indicators 408*a*-408*j* are interactive in connection with the report canvas 404. For instance, in response to a detected user selection of one or more of the dimension indicators 408*a*-408*j* (e.g., a drag-and-drop user interaction), the digital data analytics management system 106 generates or updates one or more reports within the report canvas 404.

To illustrate, as shown in FIG. 4A, in response to a detected selection of an "Ad Name" dimension indicator, the digital data analytics management system 106 generates and provides a dimension report display 410 including a dimension report associated with the "Ad Name" dimension of the active ingested data collection (e.g., "Ad Campaigns). As shown, the dimension report display 410 includes a dimension name 412 of the dimension associated with the report illustrated in the dimension report display 410. Additionally, the dimension report display 410 includes dimension element indicators 414*a*-414*k* associated with dimension elements of the "Ad Name" dimension. As shown, each dimension element indicator 414*a*-414*k* includes a dimension element name or other data associated with the associated dimension element. The dimension report display 410 also includes other metric displays associated with the dimension elements of the current dimension (e.g., "Ad Views" associated with each "Ad Name").

As shown in FIG. 4A, the "Ad Name" dimension includes several problems within its dimension elements. For example, the dimension report display 410 for the "Ad Name" dimension indicates that a dimension element name includes a typographical error (e.g., shown by the dimension element indicator 414*e*, "Let's eat kids!") and should be merged with another correctly named dimension element (e.g., shown by the component indicator 414*a*, "Let's eat, kids!"). Additionally, the dimension report display 410 for the "Ad Name" dimension indicates that a dimension element erroneously exists within the "Ad Name" dimension (e.g., shown by the dimension element indicator 414*j*, "—Dev Ad—"). In one or more embodiments, the dimension derivation system 102 generates a derived dimension that causes data to be read out of the active ingested data collection so as to correct these problems within the "Ad Name" dimension, even though raw data has already been ingested into the active ingested data collection (e.g., "Ad Campaigns").

Figure 4B:
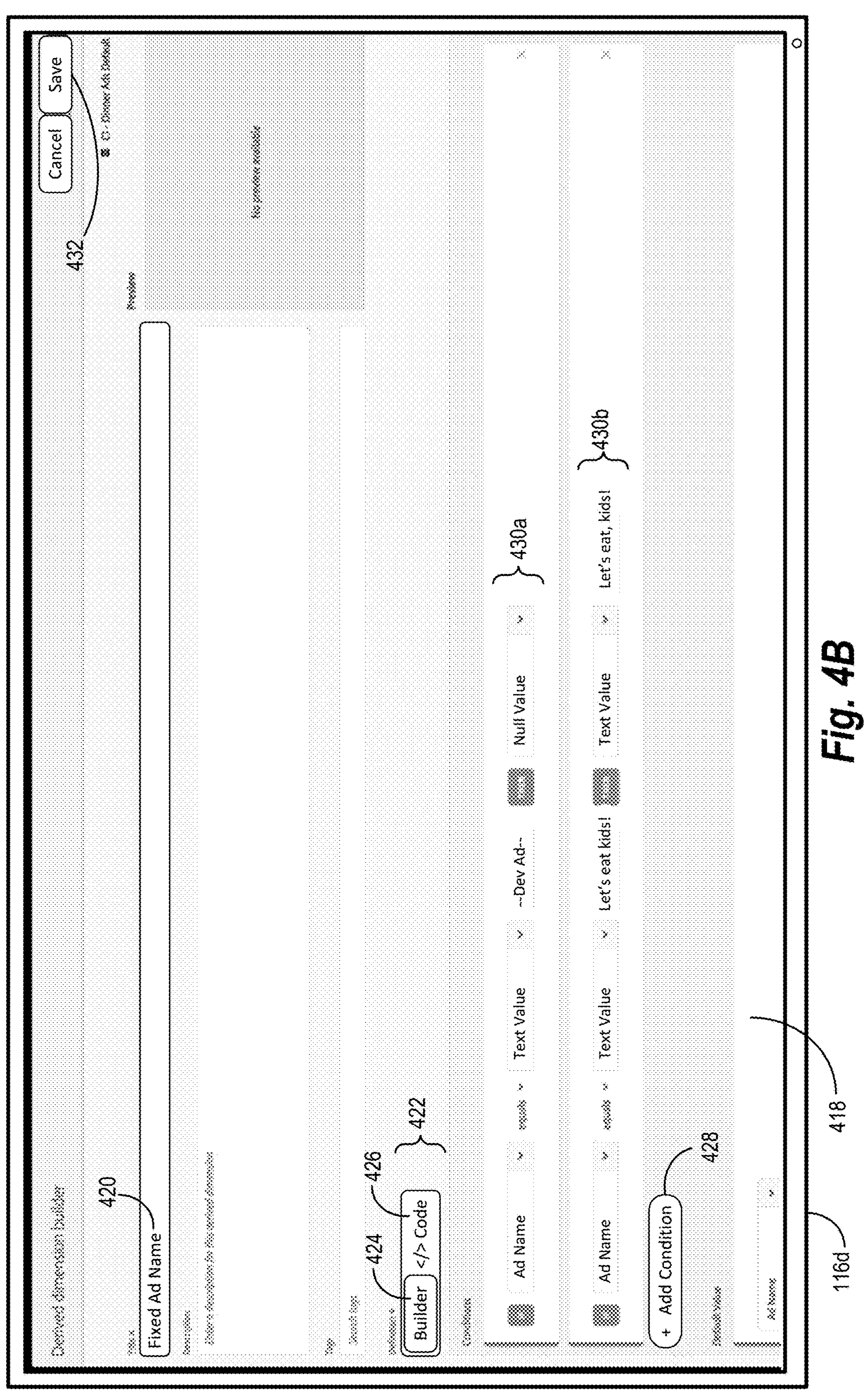

For example, in response to a detected selection of the derived dimension builder control 416, as shown in FIG. 4A, the dimension derivation system 102 generates and provides a derived dimension builder user interface 418 for display on the client computing device 116*d*, as shown in FIG. 4B. In one or more embodiments, the dimension derivation system 102 generates the derived dimension builder user interface 418 including a title text box 420 along with a configuration selector 422. For instance, in response to a detected selection of the builder configuration selector 424, the dimension derivation system 102 provides the dimension derivation system 102 iteratively updates conditional builder components 430*a*, 430*b* to include pre-populated selection elements by which a user configures one or more user-defined definitions.

As shown in FIG. 4B, the conditional builder components 430*a*, 430*b* include selected elements that configure conditional if/then statements. In response to a detected selection of an add condition button 428, the dimension derivation system 102 provides any number of conditional builder components to configure additional user-defined definitions. Additionally in response to a detected selection of the save button 432, the dimension derivation system 102 saves the user-defined definition according to the selections within the conditional builder components 430*a*, 430*b* for use in connection with one or more ingested data collections.

Additionally, rather than enabling or requiring a user to configure a user-defined definition via the conditional builder components 430*a*, 430*b* as shown in FIG. 4B, the dimension derivation system 102 updates the derived dimension builder user interface 418 to include less-structured code or scripting input. For example, in response to a detected selection of the code configuration selector 426 in the configuration selector 422, as shown in FIG. 4B, the dimension derivation system 102 updates the derived dimension builder user interface 418 to replace the conditional builder components 430*a*, 430*b* with a code input area 434, as shown in FIG. 4C.

Utilizing the code input area, a user configures a user-defined definition free-hand in any of a variety of applicable notations, syntaxes, or languages (e.g., such as JEXL). Additionally or alternatively, following configuration of one or more user-defined definitions via the conditional builder components 430*a*, 430*b*, as shown in FIG. 4B, the dimension derivation system 102 generates or translates the corresponding lines of code for display in response to the detected selection of the code configuration selector 426. Conversely, following configuration of one or more user-defined definitions via manually input code in the code input area 434, the dimension derivation system 102 generates and populates one or more corresponding conditional builder components in response to a detected selection of the builder configuration selector 424. In this way, the dimension derivation system 102 enables a user to toggle back and forth between a structured builder view and a less structured code view of the same user-defined definitions 433*a*, 433*b*.

Figure 4C:
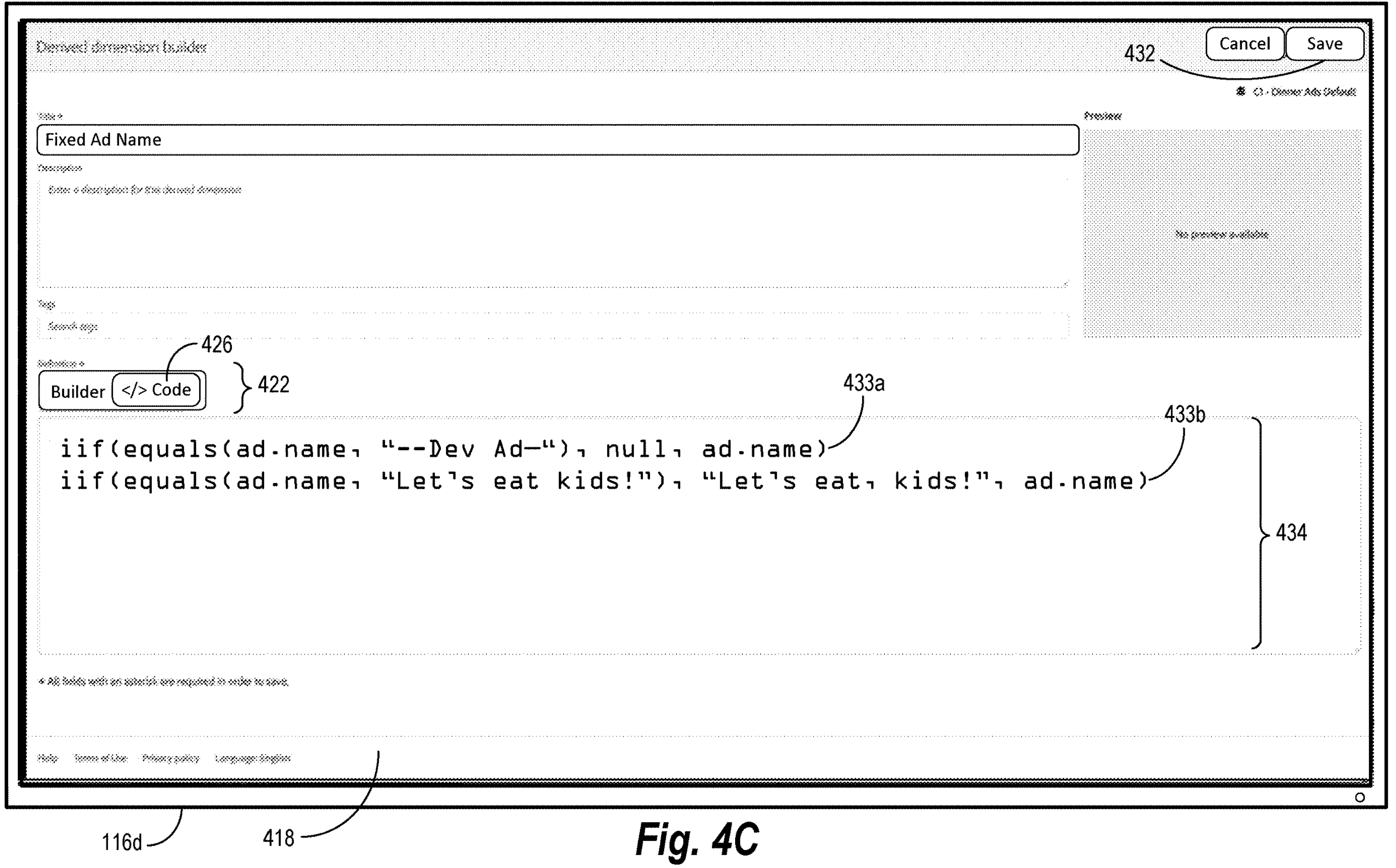

As shown in FIGS. 4B and 4C, the "Fixed Ad Name" user-defined definitions 433*a*, 433*b* effectively modify various dimension elements within the "Ad Name" dimension. For example, the user-defined definition 433*a* identifies any "—Dev Ad—" dimension elements in the "Ad Name" dimension in the ingested data collection, and when data is read out of the "—Dev Ad—" dimension elements at query time, replaces the dimension element name with "null"—causing that dimension element to be skipped in any further analysis or reporting in response to the query. Additionally, the user-defined definition 433*b* identifies any "Let's eat kids!" dimension elements in the "Ad Name" dimension in the ingested data collection, and while data is read out of the "Let's eat kids!" dimension elements at query time, renames those dimension elements as "Let's eat, kids!"

Figure 4D:
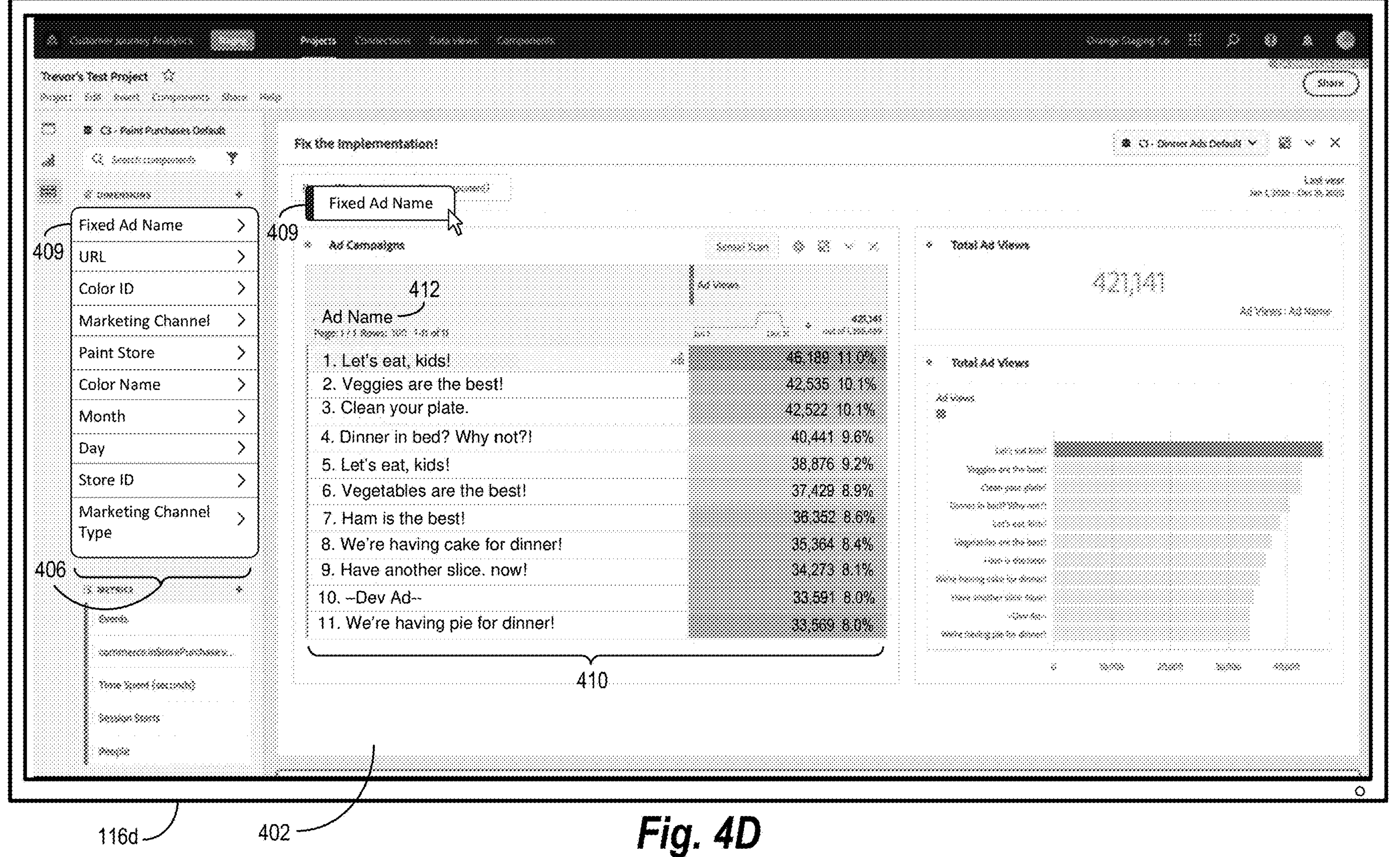

In response to a detected selection of the save button 432, as shown in FIG. 4C, the dimension derivation system 102 adds a derived dimension indicator 409 to the listing of dimensions 406 in the analytics management user interface 402, as shown in FIG. 4D. In one or more embodiments, in response to a query associated with a user-defined definition corresponding to derived dimension indicator 409, the dimension derivation system 102 generates the associated derived dimension within the currently active ingested data collection. For example, as shown in FIG. 4D, in response to a detected drag-and-drop of the derived dimension indicator 409 onto the dimension name 412 within dimension report display 410, the dimension derivation system 102 recognizes a query associated with the corresponding user-defined definitions, generates an associated derived dimension, and updates the dimension report display 410 according to the derived dimension.

As discussed above, the dimension derivation system 102 generates the associated derived dimension by first generating a fallback expression based on the user-defined definition configured via the derived dimension builder user interface 418, shown in FIGS. 4B and 4C. The dimension derivation system 102 further generates the derived dimension by identifying one or more dimensions and/or dimension elements in the active ingested data collection that correspond with the fallback expression, and effectively modifying the one or more dimensions and/or dimension elements in accordance with the fallback expression by causing data to be read from the one or more dimension and/or dimension elements in accordance with the fallback expression. The dimension derivation system 102 also updates the dimension report display 410 based on the generated derived dimension.

Figure 4E:

For example, as shown in FIG. 4E, the dimension derivation system 102 updates the dimension report display 410 according to the derived dimension generated based on the "Fixed Ad Name" user-defined definition (e.g., indicated by the updated dimension name 412). As shown, the dimension report display 410 indicates the dimension elements of the derived dimension "Fixed Ad Name" no longer include the "—Dev Ad—" dimension element. Additionally as shown, the dimension elements of the derived dimension "Fixed Ad Name" no longer include the "Let's eat kids!" dimension element. Instead, as indicated by the ad views increase associated with the "Let's eat, kids!" dimension element, the data associated with the previous "Let's eat kids!" dimension element has been read out of the ingested data collection such that it has merged with the data associated with the "Let's eat, kids!" dimension element in the generated report.

In one or more embodiments, the dimension derivation system 102 allows for user-defined definitions associated with derived dimension to be edited and/or updated any number of times. For example, in response to determining that a particular dimension element is missing from the displayed dimension elements associated with the "Fixed Ad Name" derived dimension, a user may decide to further edit the user-defined definition(s) associated with the "Fixed Ad Name" derived dimension. Accordingly, in response to a further selection of the derived dimension indicator 409 (e.g., in connection with the derived dimension builder control 416), the dimension derivation system 102 provides the previously stored user-defined definitions associated with the "Fixed Ad Name" derived dimension in the derived dimension builder user interface 418, as shown in FIG. 4F.

Figure 4F:
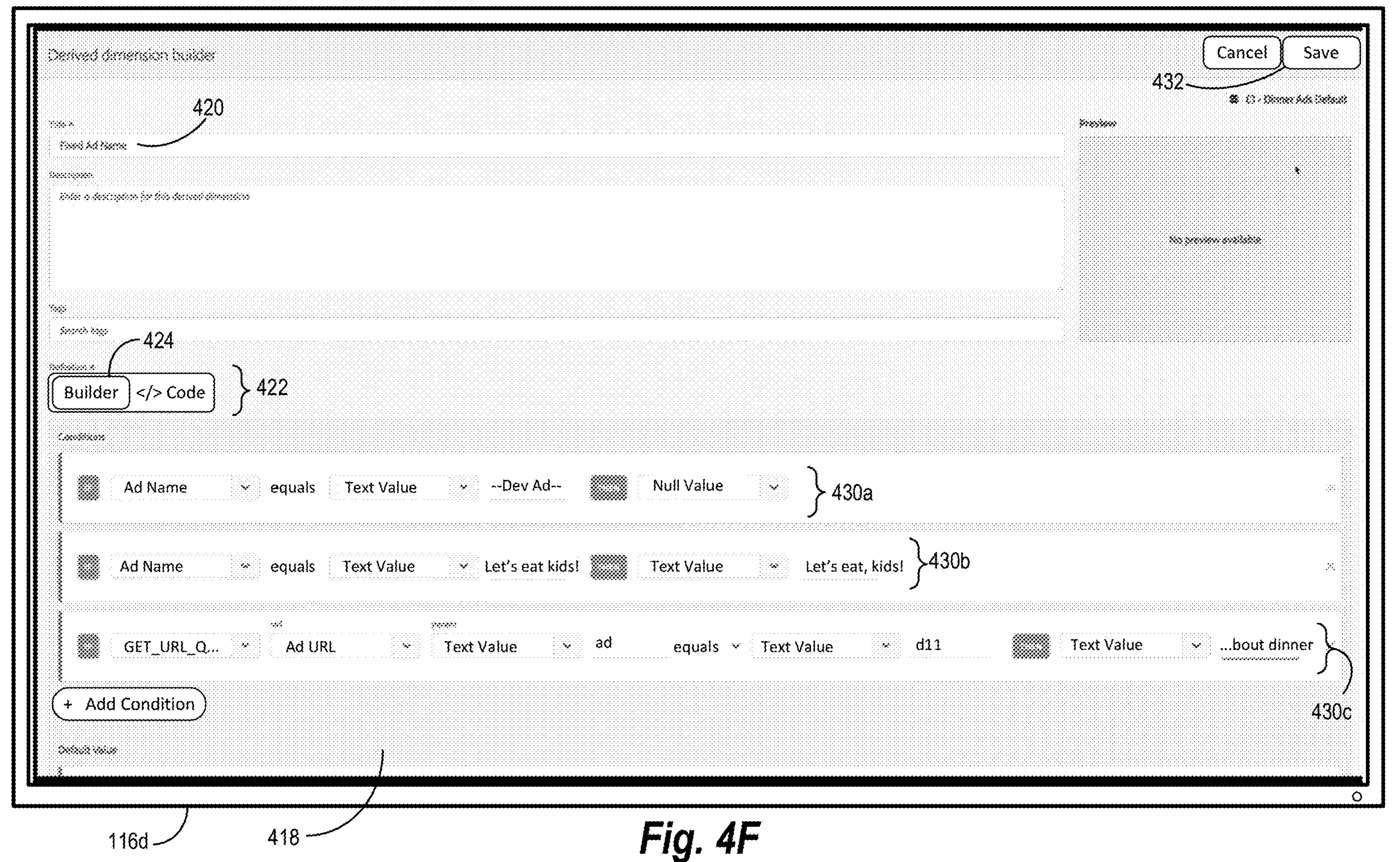

For example, as shown in FIG. 4F, the dimension derivation system 102 provides the stored configurations for the "Fixed Ad Name" user-defined definition within the derived dimension builder user interface 418 for further configuration. Then, in response to detected user interactions with a conditional builder component 430*c* and a detected selection of the save button 432, the dimension derivation system 102 updates the "Fixed Ad Name" user-defined definition to include the additional condition indicated by the user selections within the conditional builder component 430*c*.

Figure 4G:
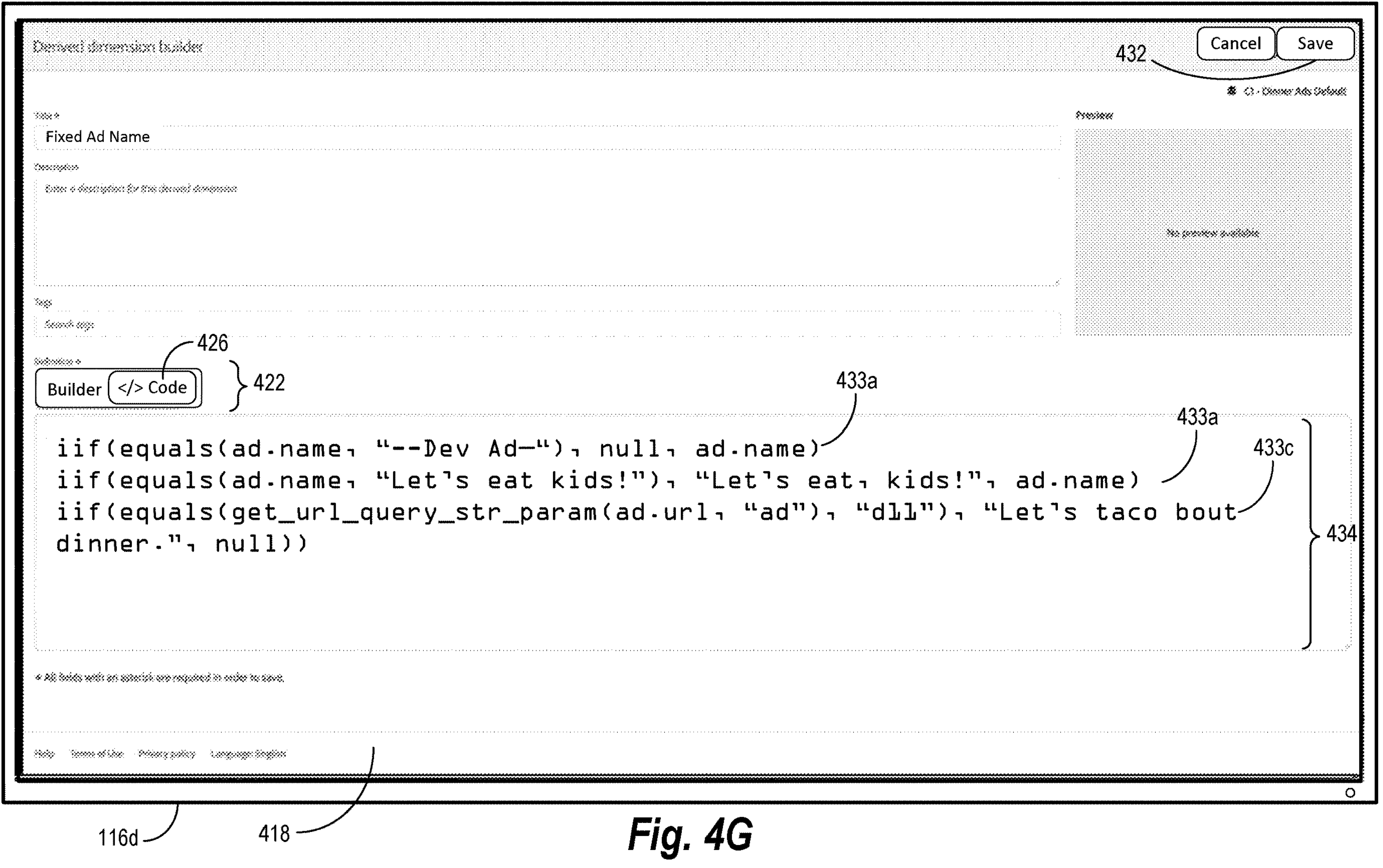

As discussed above, in response to a detected selection of the code configuration selector 426, the dimension derivation system 102 updates the derived dimension builder user interface 418 with the code input area 434, as shown in FIG. 4G. For example, the dimension derivation system 102 generates the user-defined definition 433*c* corresponding to the user selections within the conditional builder component 430*c*. Alternatively, the user may input the user-defined definition 433*c*, and the dimension derivation system 102 generates the conditional builder component 430*c* to correspond to the user-defined definition 433*c*. In response to a detected selection of the save button 432, the dimension derivation system 102 saves the updated "Fixed Ad Name" user-defined definition (e.g., comprising one of more of the user defined-definitions 433*a*-433*c*).

Figure 4H:
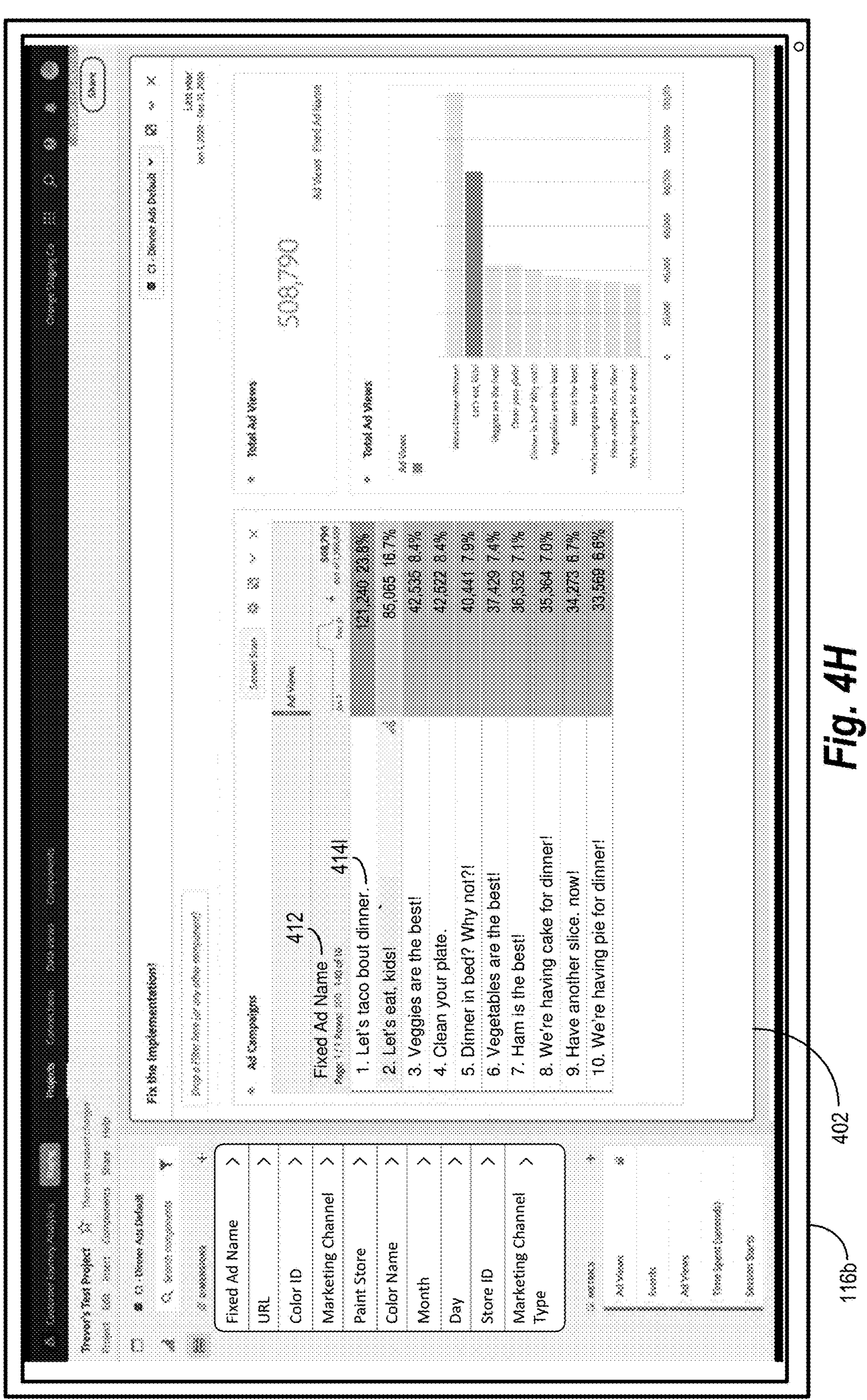

As discussed above with regard to FIG. 4E, the dimension derivation system 102 generates a derived dimension associated with the updated "Fixed Ad Name" user-defined definition in response to a user selection of the derived dimension indicator 409. For example, as shown in FIG. 4H, in response to a detected drag-and-drop of the derived dimension indicator 409 onto the dimension name 412 within the dimension report display 410, the dimension derivation system 102 generates an updated derived dimension according to the now updated "Fixed Ad Name" user-defined definition. As shown, based on the updated if/then condition in the updated "Fixed Ad Name" user-defined definition, the dimension derivation system 102 identifies previously mis-tagged data within the ingested data collection and reads this data into a new dimension element within the "Fixed Ad Name" derived dimension and associated with the dimension component indicator 414*l* (e.g., "Let's taco bout dinner.") at query time. As shown in FIG. 4H, this previously mis-tagged data is associated with an ad campaign that had the highest number of ad views of any of the campaigns represented among the dimension elements.

In additional or alternative embodiments, the dimension derivation system 102 provides additional functionality in connection with derived dimensions. For example, if the dimension derivation system 102 generates the "Fixed Ad Name" derived dimension mid-campaign (e.g., meaning that the digital data analytics engine 108 ingests additional data associated with "Fixed Ad Name" derived dimension), the dimension derivation system 102 updates the dimension report 410 indicating the newly ingested data in accordance with the "Fixed Ad Name" derived dimension anytime a query is made that relies upon the "Fixed Ad Name" derived dimension. For example, the dimension derivation system 102 updates any newly ingested data with the ad name, "Let's eat kids!" to have the ad name, "Let's eat, kids!" and so forth if the Fixed Ad Name" derived dimension is used in another query. Because the derived dimension is generated a query time, the dimension derivation system 102 applies the derived dimension to any data currently stored in the ingested data collection being queried.

As mentioned above, the dimension derivation system 102 saves derived dimensions for use in connection with ingested data collections. For example, in response to an analyst closing a particular ingested data collection within the analytics management user interface 402, the dimension derivation system 102 essentially deactivates any derived dimensions associated with that ingested data collection. In order to view the changes caused by the derived dimensions at query time against that ingested data collection at a later point, the dimension derivation system 102 would have to again read data out of the ingested data collection in accordance with the derived dimensions in response to a query against the ingested data collection. In this way, derived dimension do not the underlying data within an ingested data collection, but rather modify how data is read out of an ingested data collection. In one or more embodiments, the dimension derivation system 102 saves derived dimensions at the digital data analytics management system 106 along with their associated ingested data collections. Additionally or alternatively, the dimension derivation system 102 saves derived dimension along with their associated schemas at the digital data analytics engine 108.

Figure 5:
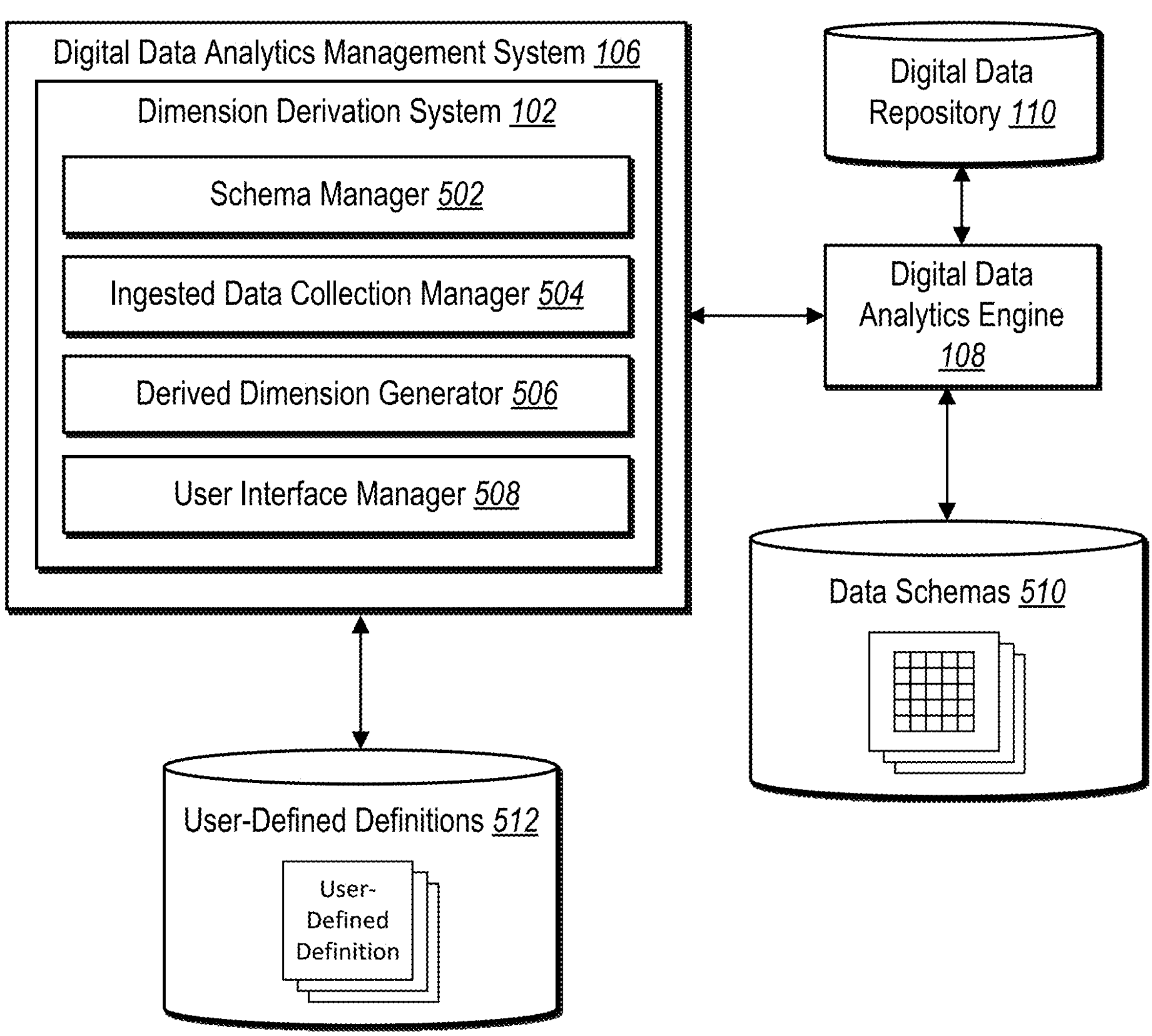
FIG. 5 illustrates a schematic diagram of the dimension derivation system in accordance with one or more embodiments.

FIG. 5 illustrates a detailed schematic diagram of an embodiment of the dimension derivation system 102 in accordance with one or more embodiments. As discussed above, the dimension derivation system 102 is operable on a variety of computing devices. Thus, for example, the dimension derivation system 102 is operable on the server(s) 107 (as shown in FIG. 1). Additionally or alternatively, the dimension derivation system 102 is operable on the client computing device 116*d*. In one or more embodiments, the dimension derivation system 102 includes a schema manager 502, and ingested data collection manager 504, a derived dimension generator 506, and a user interface manager 508. As further shown in FIG. 5, the dimension derivation system 102 operates in connection with a collection of user-defined definitions 512, and the digital data analytics engine 108, which operates in connection with the digital data repository 110 and a collection of data schemas 510.

As mentioned above, and as shown in FIG. 5, the dimension derivation system 102 includes the schema manager 502. In one or more embodiments, the schema manager 502 accesses one or more schemas associated with an ingested data collection. For example, the schema manager 502 accesses the collection of data schemas 510 (e.g., via the digital data analytics engine 108 or otherwise in connection with an ingested data collection). More specifically, the schema manager 502 identifies a schema associated with an ingested data collection by determining the ingested data collection is associated with metadata indicating that it is organized according to a specific schema.

Additionally or alternatively, the schema manager 502 extracts, distills, or generates a schema from an ingested data collection. For example, the schema manager 502 analyzes the ingested data collection to determine a system of organization within the ingested data collection. The schema manager 502 then generates the schema associated with the ingested data collection based on the determined system of organization.

As mentioned above, and as shown in FIG. 5, the dimension derivation system 102 includes the ingested data collection manager 504. In one or more embodiments, the ingested data collection manager 504 accesses or generates an ingested data collection. For example, in one embodiment, the ingested data collection manager 504 accesses or receives an ingested data collection from the digital data analytics engine 108. In that embodiment, the digital data analytics engine 108 receives or accesses raw data from the user interaction platform 112 and organizes the raw data into an ingested data collection based on one or more of the collection of data schemas 510. Additionally or alternatively, the ingested data collection manager 504 receives the raw data directly from the user interaction platform 112 and ingested the raw data into an ingested data collection according to one or more schemas.

As mentioned above, and as shown in FIG. 5, the dimension derivation system 102 includes the derived dimension generator 506. In one or more embodiments, the derived dimension generator 506 receives user-defined definitions, generates fallback expressions, generates derived dimensions based on the fallback expressions, and generates reports according to the generated derived dimensions. For example, the derived dimension generator 506 receives a user-defined definition in response to one or more user selections and/or inputs via one or more user interfaces (e.g., the derived dimension builder user interface 418 discussed above). Additionally or alternatively, the derived dimension generator 506 accesses a previously saved user-defined definition from the collection of user-defined definitions 512.

In one or more embodiments, the derived dimension generator 506 generates a fallback expression aligned to a schema of an ingested data collection and based on a user-defined definition. For example, the derived dimension generator 506 generates a fallback expression by transposing or translating the user-defined definition into a regular expression that utilizes the syntax and formatting specified by the schema. In at least one embodiment, the derived dimension generator 506 translates a user-defined definition in JEXL to a fallback expression that is aligned to a schema recognizable by the digital data analytics engine 108.

In one or more embodiments, the derived dimension generator 506 generates a derived dimension utilizing the fallback expression. For example, the derived dimension generator 506 generates a derived dimension by identifying one or more existing dimensions or dimension components in the ingested data collection that correspond with the fallback expression. In at least one embodiment, the derived dimension generator 506 generates the derived dimension in response to detecting a query based on the user-defined definition corresponding to the derived dimension.

The derived dimension generator 506 further modifies the identified existing dimensions and/or dimension elements based on the fallback expression. For example, the derived dimension generator 506 modifies dimensions and/or dimension components by reading data out of an incorrectly named column or data structure into a correctly named column or data structure, reading data associated with one column or data structure into another column or data structure, and reading data out of certain columns or data structures so that they are skipped during analysis and reporting.

In at least one embodiment, the derived dimension generator 506 generates a derived dimension as a new column or meta-field associated with an ingested data collection at query time on-the-fly. For example, the derived dimension generator 506 utilizes the instructions of the associated fallback expression to modify how data is read out of the indexed data within the ingested data collection and save the data in a meta-field for use in reporting or responding to a query. Thus, the derived dimension generator 506 modifies dimensions and/or dimension elements after raw data is ingested into an ingested data collection, and without destroying any of the underlying data in the ingested data collection. Thus, the derived dimension generator 506 generates derived dimensions to modify and/or correct how data is read out of an ingested data collection without requiring timely and expensive manual queries or re-ingestion of the data within the ingested data collection.

The derived dimension generator 506 also generates analysis reports according to derived dimensions. For example, the derived dimension generator 506 generates reports reflecting metrics applied to the existing dimensions and/or dimension components that are modified by the derived dimension. Thus, the derived dimension generator 506 generates reports that reflect data merges, additions, and removals enacted by the generation of a derived dimension.

As mentioned above, and as shown in FIG. 5, the dimension derivation system 102 includes the user interface manager 508. In one or more embodiments, the user interface manager 508 generates user interfaces and user interface elements in connection with derived dimensions. For example, the user interface manager 508 generates the derived dimension builder user interface 418, and detects user interactions with the conditional builder components and code input areas therein. Additionally, the user interface manager 508 generates and updates one or more dimension report display(s) 410 to reflect reports according to one or more derived dimensions. The user interface manager 508 also generates or identifies a query in response to a detected user interaction with a derived dimension indicator 409 associated with a particular user-defined definition, and in turn instructs the derived dimension generator 506 to generate the derived dimension defined by the user-defined definition.

Each of the components 502-508 of the dimension derivation system 102 includes software, hardware, or both. For example, the components 502-508 includes one or more instructions stored on a computer-readable storage medium and executable by processors of one or more computing devices, such as a client computing device or server device. When executed by the one or more processors, the computer-executable instructions of the dimension derivation system 102 causes the computing device(s) to perform the methods described herein. Alternatively, the components 502-508 includes hardware, such as a special-purpose processing device to perform a certain function or group of functions. Alternatively, the components 502-508 of the dimension derivation system 102 includes a combination of computer-executable instructions and hardware.

Furthermore, the components 502-508 of the dimension derivation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 502-508 may be implemented as a stand-alone application, such as a desktop or mobile application. Furthermore, the components 502-508 may be implemented as one or more web-based applications hosted on a remote server. The components 502-508 may also be implemented in a suite of mobile device applications or "apps." To illustrate, the components 502-508 may be implemented in an application, including but not limited to ADOBE ANALYTICS CLOUD, such as ADOBE ANALYTICS, ADOBE AUDIENCE MANAGER, ADOBE CAMPAIGN, ADOBE EXPERIENCE MANAGER, ADOBE TARGET, and ADOBE CUSTOMER JOURNEY ANALYTICS. "ADOBE," "ANALYTICS CLOUD," "ANALYTICS," "AUDIENCE MANAGER," "CAMPAIGN," "EXPERIENCE MANAGER," "CUSTOMER JOURNEY ANALYTICS," "TARGET," and "CREATIVE CLOUD" are either registered trademarks or trademarks of Adobe Systems Incorporated in the United States and/or other countries.

Figure 6:
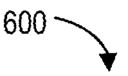
FIG. 6 illustrates a flowchart of a series of acts for generating a derived dimension in accordance with one or more embodiments.
Figure 6:
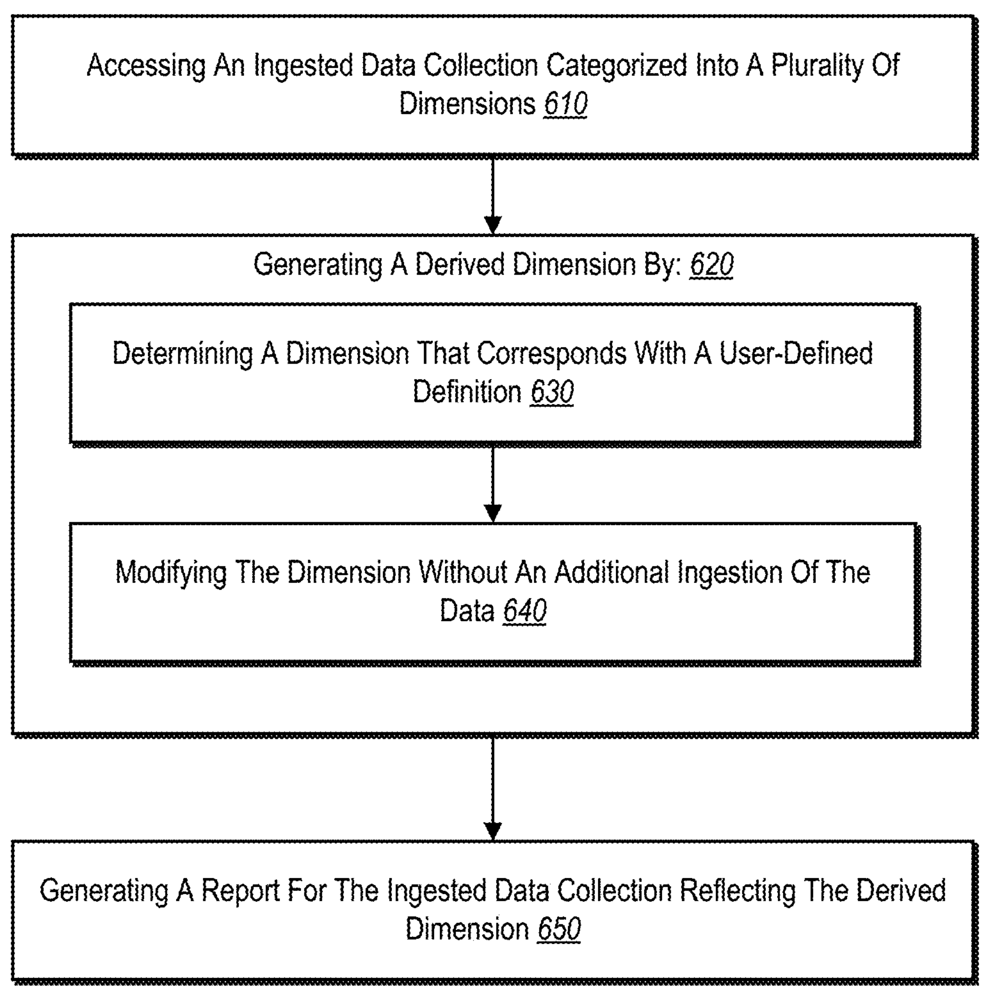

FIGS. 1-5, the corresponding text, and the examples provide a number of different methods, systems, devices, and non-transitory computer-readable media of the dimension derivation system 102. In addition to the foregoing, one or more embodiments can also be described in terms of flowcharts comprising acts for accomplishing a particular result, as shown in FIG. 6. FIG. 6 may be performed with more or fewer acts. Further, the acts may be performed in differing orders. Additionally, the acts described herein may be repeated or performed in parallel with one another or parallel with different instances of the same or similar acts.

As mentioned, FIG. 6 illustrates a flowchart of a series of acts 600 for generating a derived dimension in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions that, when executed by one or more processors, cause a computing device to perform the acts of FIG. 6. In some embodiments, a system can perform the acts of FIG. 6.

As shown in FIG. 6, the series of acts 600 includes an act 610 of accessing an ingested data collection categorized into a plurality of dimensions. For example, the act 610 involves accessing an ingested data collection categorized into a plurality of dimensions, the plurality of dimensions being set prior to ingestion of data into the ingested data collection. In one or more embodiments, accessing the ingested data collection can be by or within the digital data analytics management system. Additionally, the series of acts 600 can include an act of receiving a query associated with a derived dimension and relative to the ingested data collection. In at least one embodiments, accessing the ingested data collection is in response to data being ingested according to a preconfigured data organization schema by a digital data analytics engine.

In one or more embodiments, accessing or ingesting data from the digital data analytics engine includes receiving a copy of the data from a user interaction platform, and populating the plurality of dimensions with the copied data based on one or more rules associated with each dimension according to the data organization schema. For example, the data organization schema includes digital rules for ingesting data into one or more of the plurality of dimensions.

As shown in FIG. 6, the series of acts 600 includes an act 620 of generating a derived dimension. More specifically, as shown in FIG. 6, the act 620 includes generating a derived dimension by performing an act 630 of determining a dimension that corresponds with a user-defined definition. Generating a derived dimension further includes performing an act 640 of modifying the dimension without an additional ingestion of the data when retrieving data from the ingested data collection based on a query that invokes the derived dimension. For example, the act 620 involves generating a derived dimension associated with at least one dimension of the plurality of dimensions. In one or more embodiments, generating a derived dimension associated with at least one dimension of the plurality of dimensions involves determining at least one dimension of the plurality of dimensions that corresponds with a user-defined definition for the derived dimension, and modifying the at least one dimension of the plurality of dimensions based on the user-defined definition without an additional ingestion of the data. In at least one embodiment, modifying the at least one dimension is based on determining that a condition specified by the user-defined definition is satisfied by the at least one dimension. For example, modifying the dimension of the plurality of dimensions based on the user-defined definition includes modifying the dimension according to the fallback expression when reading or retrieving data from the ingested data collection. In one or more embodiments, modifying the dimension of the plurality of dimension based on the user-defined definition includes merging, copying, adding, or deleting columns within the ingested data collection without affecting original data in the digital data analytics engine. In one or more embodiments, generating the derived dimension is done a query-time and is performed in seconds (i.e., in under one minute).

Additionally, the series of acts 600 can include receiving the user-defined definition for the derived dimension by receiving a user-defined conditional fallback expression indicating how to modify the at least one dimension of the plurality of dimensions. For example, in at least one embodiment, the series of acts includes generating, based on the user-defined definition, the fallback expression aligned with the data organization schema of the ingested data collection. In one or more embodiments, modifying the at least one dimension of the plurality of dimensions based on the user-defined definition includes retroactively modifying one or more columns of the ingested data collection without destruction of the data stored in one or more columns.

As an example, modifying the at least one dimension of the plurality of dimensions based on the user-defined definition without an additional ingestion of the data can include reading the data out of the ingested data collection to change an organization the data in the report compared to an organization of the data in the ingested data collection.

In one or more embodiments, the series of acts 600 includes modifying the at least one dimension of the plurality of dimensions based on the user-defined definition without an additional ingestion of the data by reading the at least one dimension and another dimension from the ingested data collection into the derived dimension stored in a meta-field thereby merging the least one dimension and the another dimension into the derived dimension. For example, modifying the at least one dimension of the plurality of dimensions can include assigning data associated with the at least one dimension to another dimension.

In one or more embodiments, the series of acts 600 also includes modifying the at least one dimension of the plurality of dimensions based on the user-defined definition without an additional ingestion of the data by removing the at least one dimension from the plurality of dimensions when reading the data from the ingested data collection in response to the query. For example, modifying the at least one dimension of the plurality of dimensions can include earmarking the at least one dimension to be skipped within the ingested data collection.

In one or more embodiments, the series of acts 600 also includes modifying the at least one dimension of the plurality of dimensions based on the user-defined definition without an additional ingestion of the data by renaming the dimension when reading or extracting the dimension from the ingested data collection in response to the query. For example, modifying the at least one dimension of the plurality of dimensions can include renaming a column when extracting or reading the column from the ingested data collection.

As further shown in FIG. 6, the series of acts 600 includes an act 650 of generating a report for the ingested data collection reflecting the derived dimension. For example, the act 650 involves generating a report for the ingested data collection in accordance with the derived dimension. In one or more embodiments, generating the report is in response to determining results of the query upon which generated the derived dimension is based. For example, in that embodiment, the report can include the results of the query reflecting the derived dimension. Additionally or alternatively, generating the report for the ingested data collection according to the derived dimension is in connection with remaining dimensions of the plurality of dimensions.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 7:
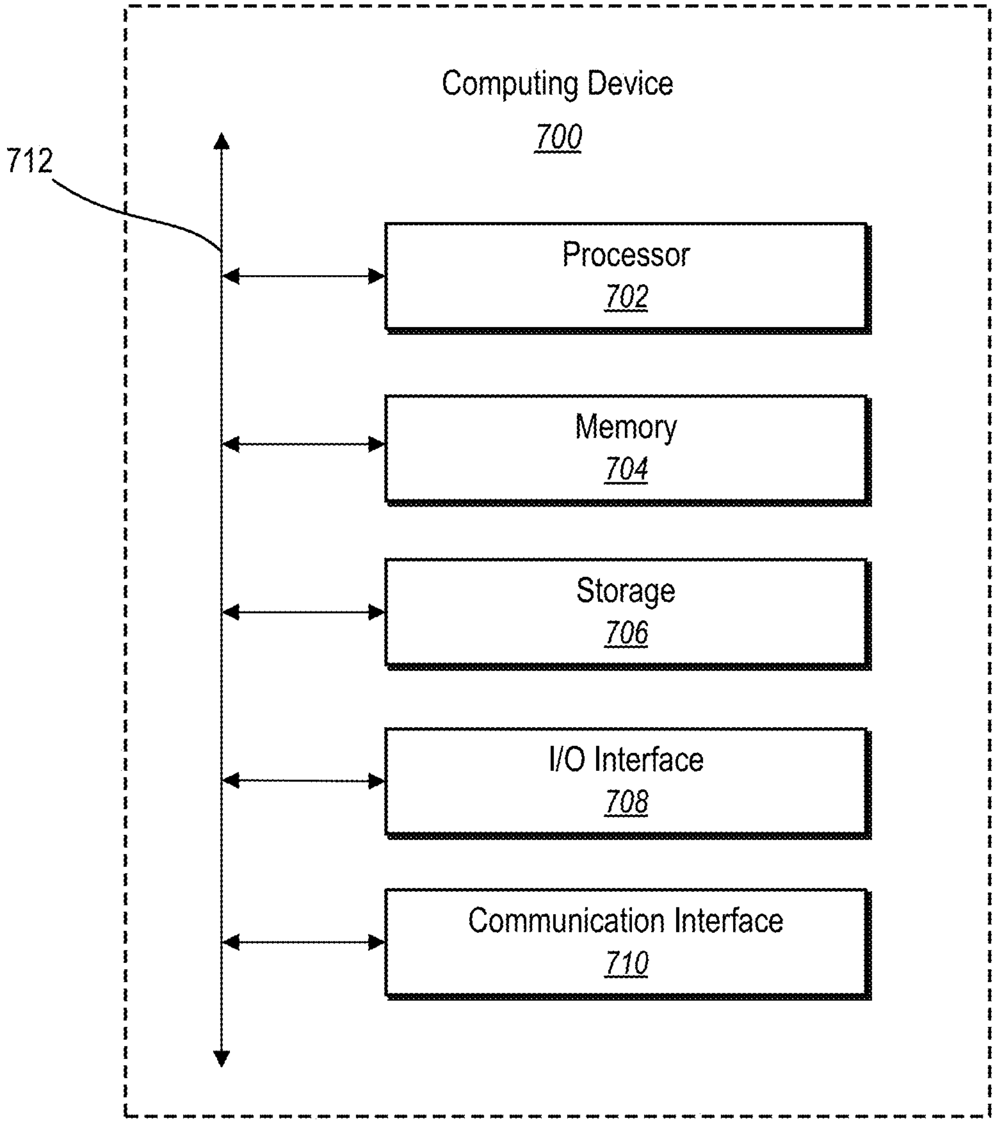
FIG. 7 illustrates a block diagram of an example computing device for implementing one or more embodiments of the present disclosure.

FIG. 7 illustrates a block diagram of an example computing device 700 that may be configured to perform one or more of the processes described above. One will appreciate that one or more computing devices, such as the computing device 700 may represent the computing devices described above (e.g., the server(s) 107, the client computing devices 116*a*-116*d*). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client computing device). Further, the computing device 700 may be a server device that includes cloud-based processing and storage capabilities.

As shown in FIG. 7, the computing device 700 includes one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, the storage device 706 includes a non-transitory storage medium described above. The storage device 706 may include a hard disk drive (HDD), flash memory, a Universal Serial Bus (USB) drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 includes hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI. The computing device 700 can further include a bus 712. The bus 712 includes hardware, software, or both that connects components of computing device 700 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

accessing, by a digital data analytics management system, an ingested data collection categorized into a plurality of dimensions, the plurality of dimensions being set prior to ingestion of the ingested data collection in accordance with a data organization schema, wherein the data organization schema specifies how to categorize raw data into the plurality of dimensions via ingestion of the raw data and wherein each dimension from the plurality of dimensions comprises a data category;

generating, utilizing at least one dimension of the plurality of dimensions, a derived dimension that includes a new, post-ingestion dimension applied to the ingested data collection to change a reading of the ingested data collection by changing how the plurality of dimensions are applied to the ingested data collection in generating one or more reports without changing the ingested data collection or the data organization schema by:

determining at least one dimension of the plurality of dimensions that corresponds with a user-defined definition for the derived dimension; and modifying the at least one dimension of the plurality of dimensions based on the user-defined definition without an additional data ingestion when retrieving data from the ingested data collection based on a query that invokes the derived dimension; and generating a report for the ingested data collection that reflects a changed reading of the ingested data collection in accordance with the derived dimension.

2. The computer-implemented method as recited in claim 1, wherein modifying the at least one dimension of the plurality of dimensions based on the user-defined definition comprises reading the data out of the ingested data collection to change a categorization of the data in the report compared to a categorization of the data in the ingested data collection.

3. The computer-implemented method as recited in claim 2, further comprising:

receiving an additional query that does not invoke the derived dimension; and reading the data out of the ingested data collection without changing the categorization of the data in the ingested data collection.

4. The computer-implemented method as recited in claim 1, further comprising receiving the user-defined definition for the derived dimension by receiving a user- defined conditional fallback expression indicating how to modify the at least one dimension of the plurality of dimensions.

5. The computer-implemented method as recited in claim 1, further comprising modifying the at least one dimension of the plurality of dimensions based on the user-defined definition by reading the at least one dimension and an additional dimension from the ingested data collection into the derived dimension stored in a meta-field thereby merging the at least one dimension and the additional dimension into the derived dimension.

6. The computer-implemented method as recited in claim 1, further comprising modifying the at least one dimension of the plurality of dimensions based on the user-defined definition by removing the at least one dimension from the plurality of dimensions when reading the data from the ingested data collection in response to the query.

7. The computer-implemented method as recited in claim 1, further comprising modifying the at least one dimension of the plurality of dimensions based on the user-defined definition by renaming the at least one dimension when reading or extracting the at least one dimension from the ingested data collection in response to the query.

8. The computer-implemented method as recited in claim 1, wherein generating the derived dimension is done at query-time and is performed in seconds.

9. A non-transitory computer-readable storage medium storing instructions thereon that, when executed by at least one processor, cause the at least one processor to perform operations comprising:

accessing, within a digital data analytics management system, an ingested data collection categorized into a plurality of dimensions, the plurality of dimensions being set prior to ingestion of data into the ingested data collection in accordance with a data organization schema, wherein the data organization schema specifies how to categorize raw data into the plurality of dimensions via ingestion of the raw data and wherein each dimension from the plurality of dimensions comprises a data category;

receiving a query associated with a derived dimension that includes a new, post-ingestion dimension applied to the ingested data collection to change a reading of the ingested data collection by changing how the plurality of dimensions are applied to the ingested data collection in generating one or more reports without changing the ingested data collection or the data organization schema;

generating, based on the query associated with the derived dimension, the derived dimension utilizing at least one dimension of the plurality of dimensions by:

determining at least one dimension of the plurality of dimensions that corresponds with a user-defined definition for the derived dimension; and based on determining that a condition specified by the user-defined definition is satisfied by the at least one dimension, reading the at least one dimension of the plurality of dimensions from the ingested data collection based on the user-defined definition without an additional ingestion of the data; and generating, in response to determining results of the query, a report comprising the results of the query reflecting a changed reading of the ingested data collection in accordance with the derived dimension.

10. The non-transitory computer-readable storage medium as recited in claim 9, wherein reading the at least one dimension of the plurality of dimensions from the ingested data collection based on the user-defined definition comprises assigning data associated with the at least one dimension to an additional dimension within the ingested data collection when retrieving the additional dimension in response to the query.

11. The non-transitory computer-readable storage medium as recited in claim 9, wherein reading the at least one dimension of the plurality of dimensions from the ingested data collection based on the user-defined definition comprises earmarking the at least one dimension to be skipped when responding to the query.

12. The non-transitory computer-readable storage medium as recited in claim 9, wherein reading the at least one dimension of the plurality of dimensions from the ingested data collection based on the user-defined definition comprises renaming a column when retrieving the column from the ingested data collection.

13. The non-transitory computer-readable storage medium as recited in claim 12, wherein generating, based on the query associated with the derived dimension, the derived dimension comprises generating the derived dimension without modifying a categorization of the ingested data collection.

14. The non-transitory computer-readable storage medium as recited in claim 9, wherein the operations further comprise accessing the ingested data collection in response to data being ingested according to a preconfigured data organization schema by a digital data analytics engine.

15. A system comprising:

at least one computer memory device comprising:

a data organization schema configured according to a plurality of dimensions, and a plurality of user-defined definitions for generating derived dimensions; and one or more servers configured to cause the system to:

ingest data from a digital data analytics engine into the plurality of dimensions within an ingested data collection according to the data organization schema, wherein the data organization schema specifies how to categorize the data into the plurality of dimensions via ingestion of the data and wherein each dimension from the plurality of dimensions comprises a data category;

generate, utilizing a dimension of the plurality of dimensions, a derived dimension that includes a new, post-ingestion dimension applied to the ingested data collection to change a reading of the ingested data collection by changing how the plurality of dimensions are applied to the ingested data collection in generating one or more reports without changing the ingested data collection or the data organization schema by:

determining the dimension of the plurality of dimensions corresponds with a user-defined definition for the derived dimension; and modifying the dimension of the plurality of dimensions based on the user-defined definition without an additional ingestion of the data when retrieving the data from the ingested data collection based on a query that invokes the derived dimension; and generate a report for the ingested data collection that reflects a changed reading of the ingested data collection according to the derived dimension in connection with remaining dimensions of the plurality of dimensions.

16. The system as recited in claim 15, wherein the one or more servers are further configured to cause the system to generate, based on the user-defined definition, a fallback expression aligned with the data organization schema of the ingested data collection.

17. The system as recited in claim 16, wherein modifying the dimension of the plurality of dimensions based on the user-defined definition comprises extracting the dimension and modifying the dimension according to the fallback expression.

18. The system as recited in claim 17, wherein the one or more servers are further configured to cause the system to store the derived dimension in a meta-field that is separate from the ingested data collection.

19. The system as recited in claim 17, wherein the one or more servers are further configured to cause the system to ingest data from the digital data analytics engine by:

receiving a copy of the data from a user interaction platform; and populating the plurality of dimensions with the copied data based on one or more rules associated with each dimension according to the data organization schema, wherein the data organization schema comprises digital rules for ingesting raw data into one or more of the plurality of dimensions.

20. The system as recited in claim 19, wherein modifying the dimension of the plurality of dimensions based on the user-defined definition comprises merging, copying, adding, or deleting columns when extracting data from the ingested data collection without affecting original data in the digital data analytics engine.

* * * * *